(12) United States Patent
Nakagoshi et al.

(10) Patent No.: US 8,260,501 B2
(45) Date of Patent: Sep. 4, 2012

(54) AWAKE STATE ESTIMATION DEVICE

(75) Inventors: Akira Nakagoshi, Toyota (JP); Kenji Kimura, Toyota (JP); Tsuyoshi Ehama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 850 days.

(21) Appl. No.: 12/241,613

(22) Filed: Sep. 30, 2008

(65) Prior Publication Data

US 2009/0048737 A1 Feb. 19, 2009

(30) Foreign Application Priority Data

Oct. 1, 2007 (JP) ................................. 2007-257272

(51) Int. Cl.
*B60W 40/09* (2012.01)
*G08B 21/06* (2006.01)
(52) U.S. Cl. ........... 701/43; 340/575; 340/576; 180/272
(58) Field of Classification Search .................... 701/43; 180/272; 340/575, 576
See application file for complete search history.

(56) References Cited

U.S. PATENT DOCUMENTS

| | | | |
|---|---|---|---|
| 4,594,583 A * | 6/1986 | Seko et al. ..................... | 340/576 |
| 2005/0046579 A1* | 3/2005 | Oyama .......................... | 340/575 |
| 2009/0132109 A1* | 5/2009 | Galley et al. ................... | 701/29 |
| 2010/0039249 A1* | 2/2010 | Schmitz et al. ................. | 340/439 |

FOREIGN PATENT DOCUMENTS

| | | |
|---|---|---|
| DE | 10 2005 035 412 A1 | 2/2007 |
| DE | 60 2004 010 968 T2 | 12/2008 |
| DE | 60 2004 011 158 T2 | 12/2008 |
| JP | 5-85221 | 4/1993 |
| JP | 5-319134 | 12/1993 |
| JP | 6-107029 | 4/1994 |
| JP | 7-9879 | 1/1995 |
| JP | 8-332871 | 12/1996 |
| JP | 9-277848 | 10/1997 |
| JP | 11-342764 | 12/1999 |
| JP | 2001-213189 | 8/2001 |
| JP | 2001-253266 | 9/2001 |
| JP | 2005-212689 | 8/2005 |
| JP | 2006-199159 | 8/2006 |

* cited by examiner

*Primary Examiner* — Paul N Dickson
*Assistant Examiner* — Wesley Potter
(74) *Attorney, Agent, or Firm* — Oblon, Spivak, McClelland, Maier & Neustadt, L.L.P.

(57) ABSTRACT

An awake state estimation portion calculates an average steering angle, an average steering angular speed and a corrective steering angle on the basis of the steering angle acquired from a steering angle detection portion. The awake state estimation portion acquires the traveling speed of the vehicle from a vehicle speed detection portion. The awake state estimation portion corrects the calculated corrective steering angle by a correction value commensurate with the type of the traveling path on which the vehicle is traveling, and estimates the degree of the awake state of the driver on the basis of the post-correction corrective steering angle. Besides, the awake state estimation portion specifically determines the correction value commensurate with the type of the traveling path on which the vehicle is traveling, on the basis of at least one of the steering angle, the average steering angular speed and the traveling speed.

8 Claims, 23 Drawing Sheets

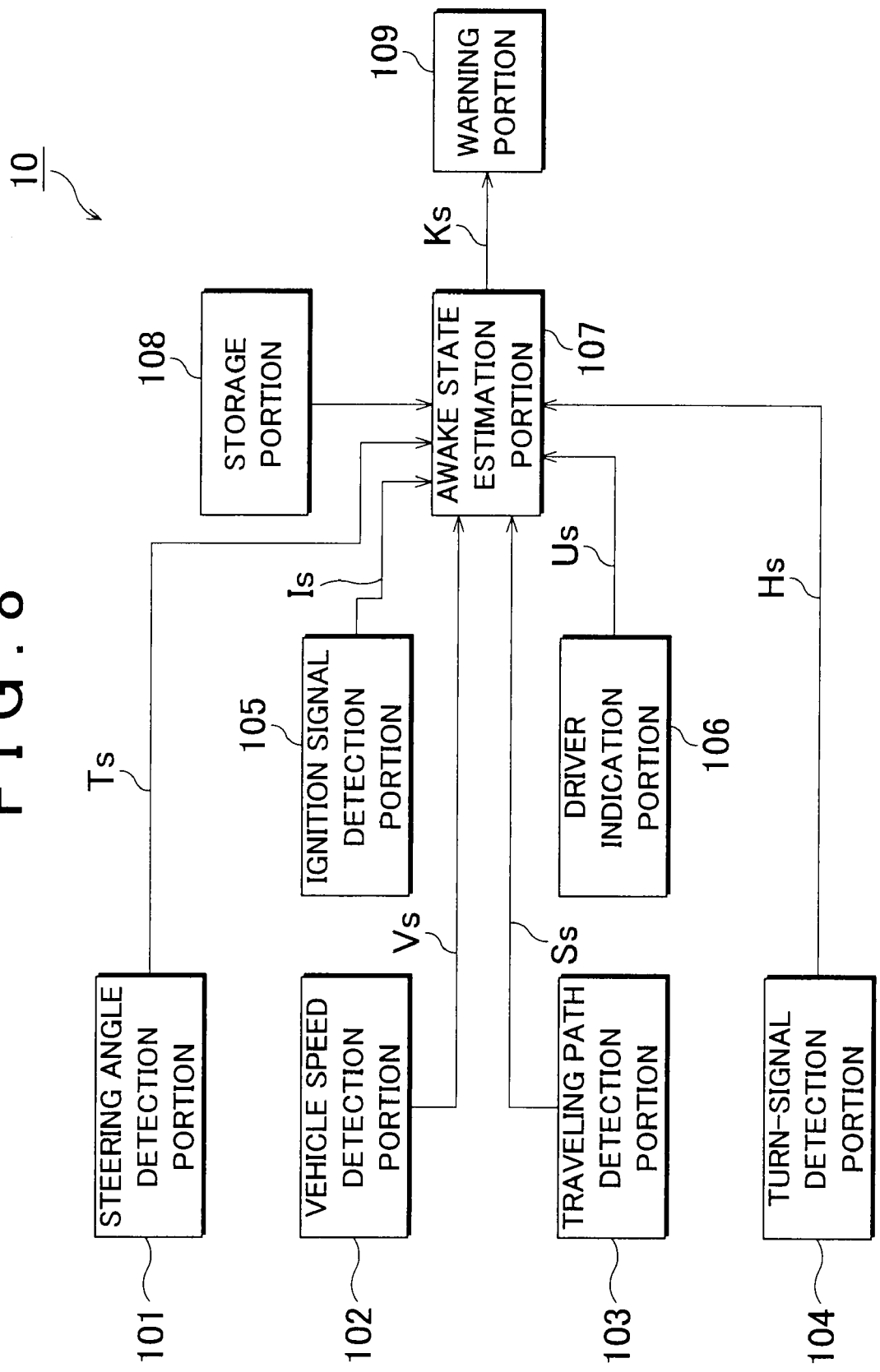

FIG. 10A
<EXPRESS ROAD>
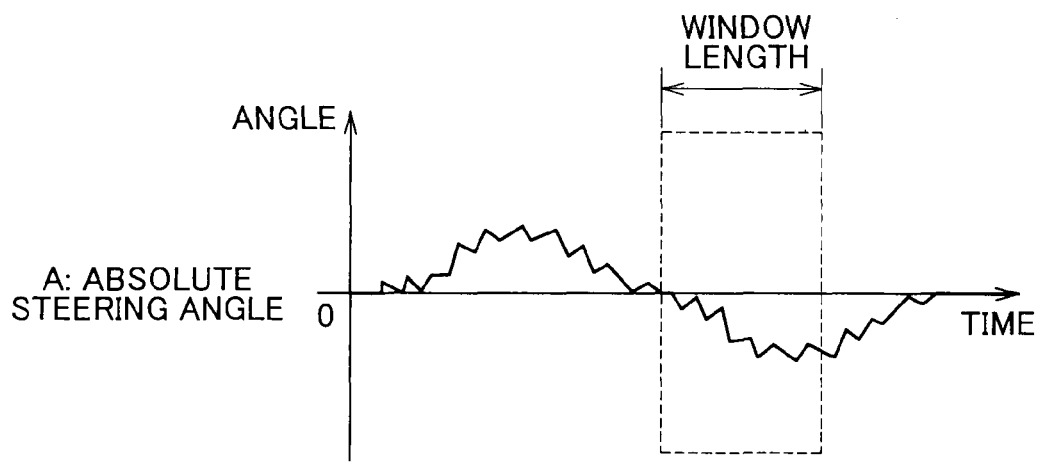
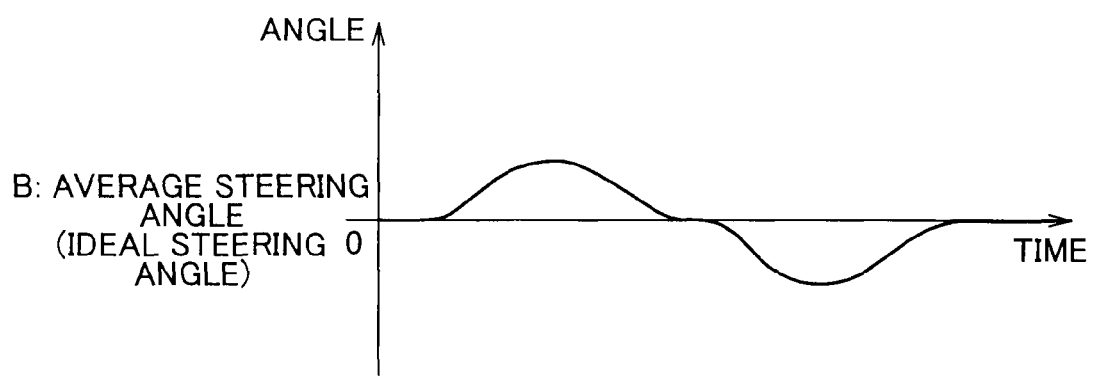
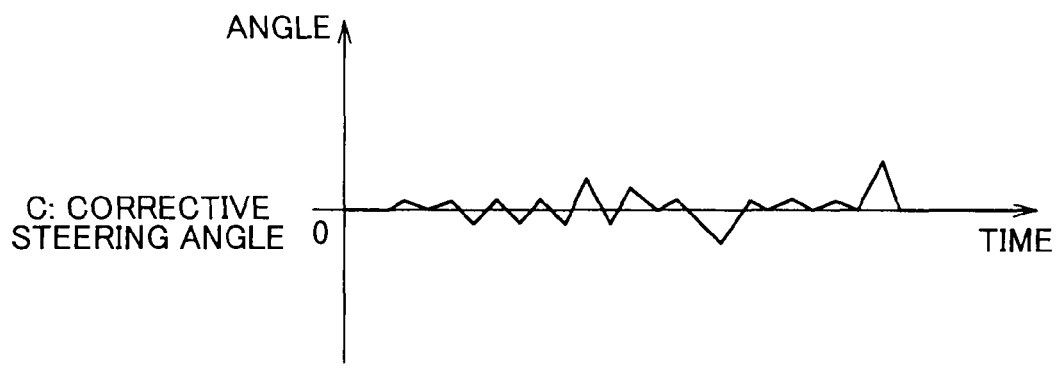

FIG. 10B
<LOCAL ROAD, MOUNTAIN ROAD>
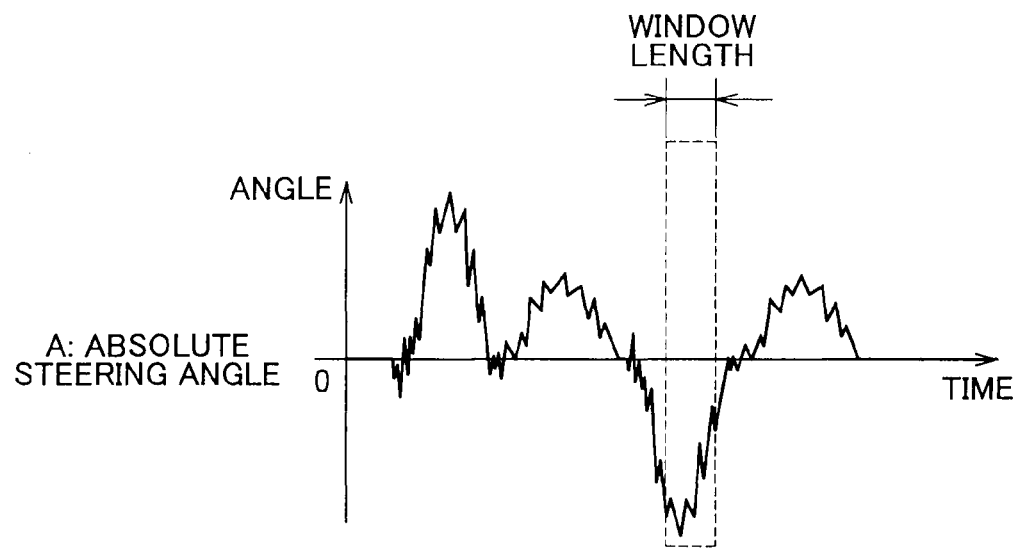
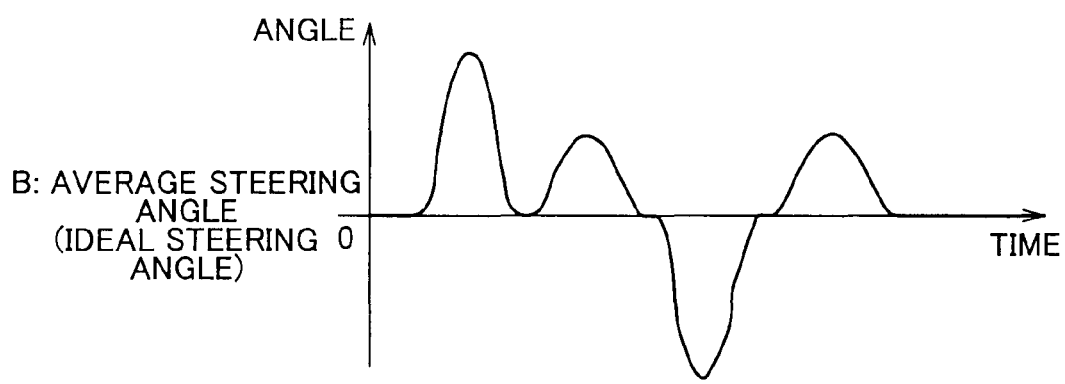
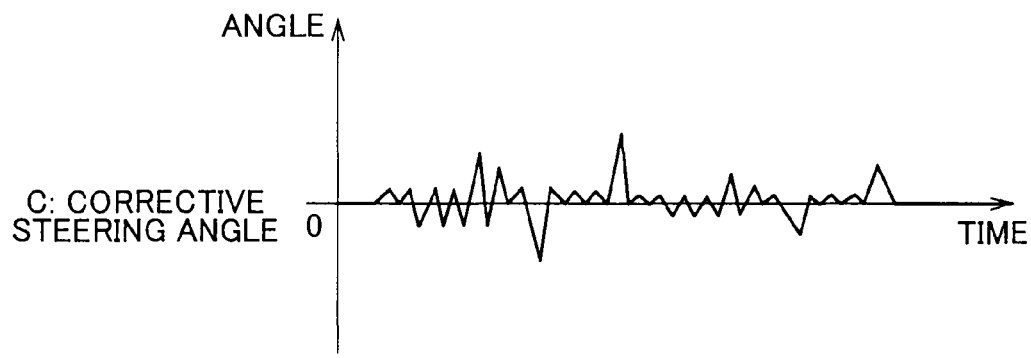

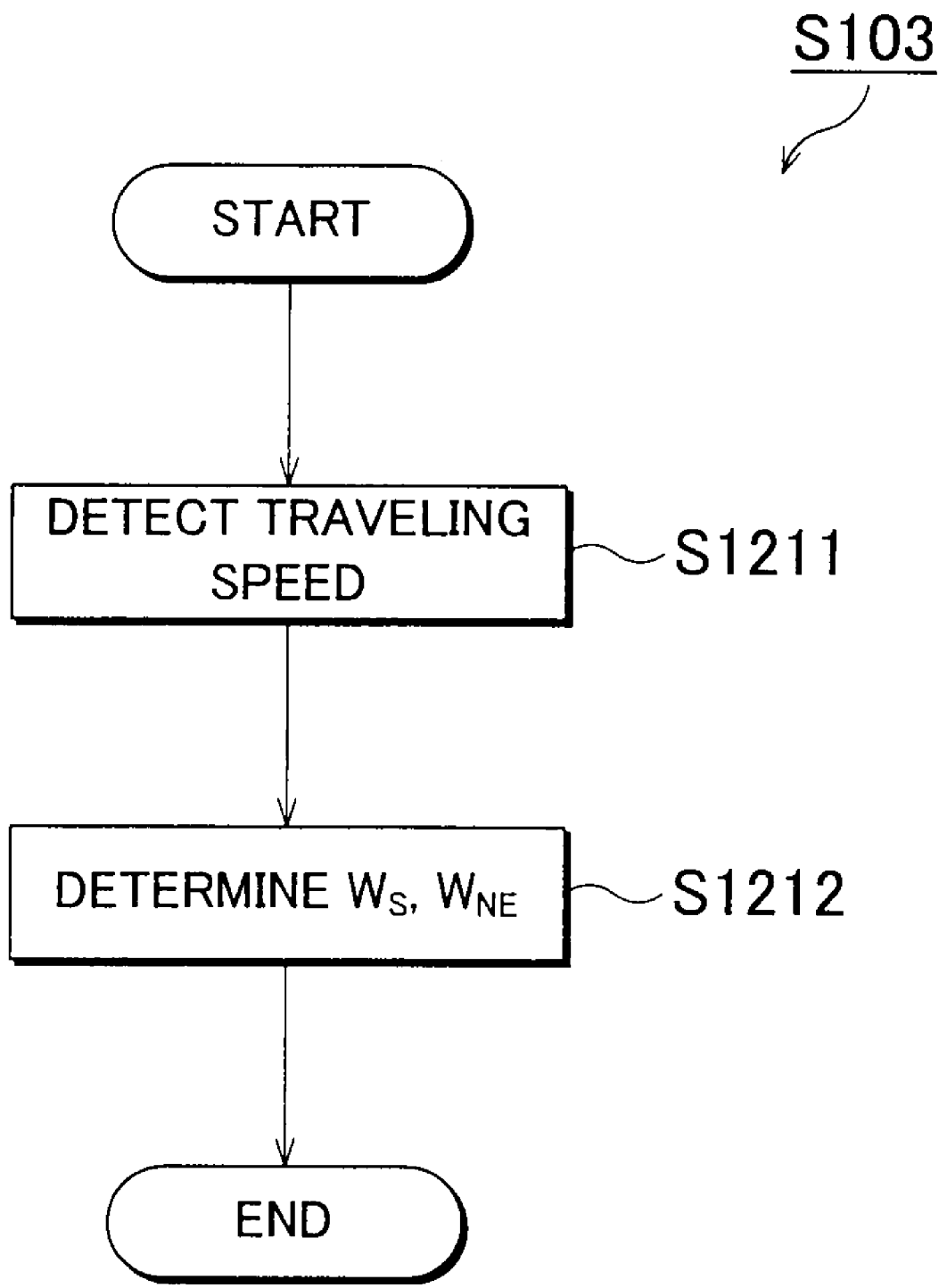

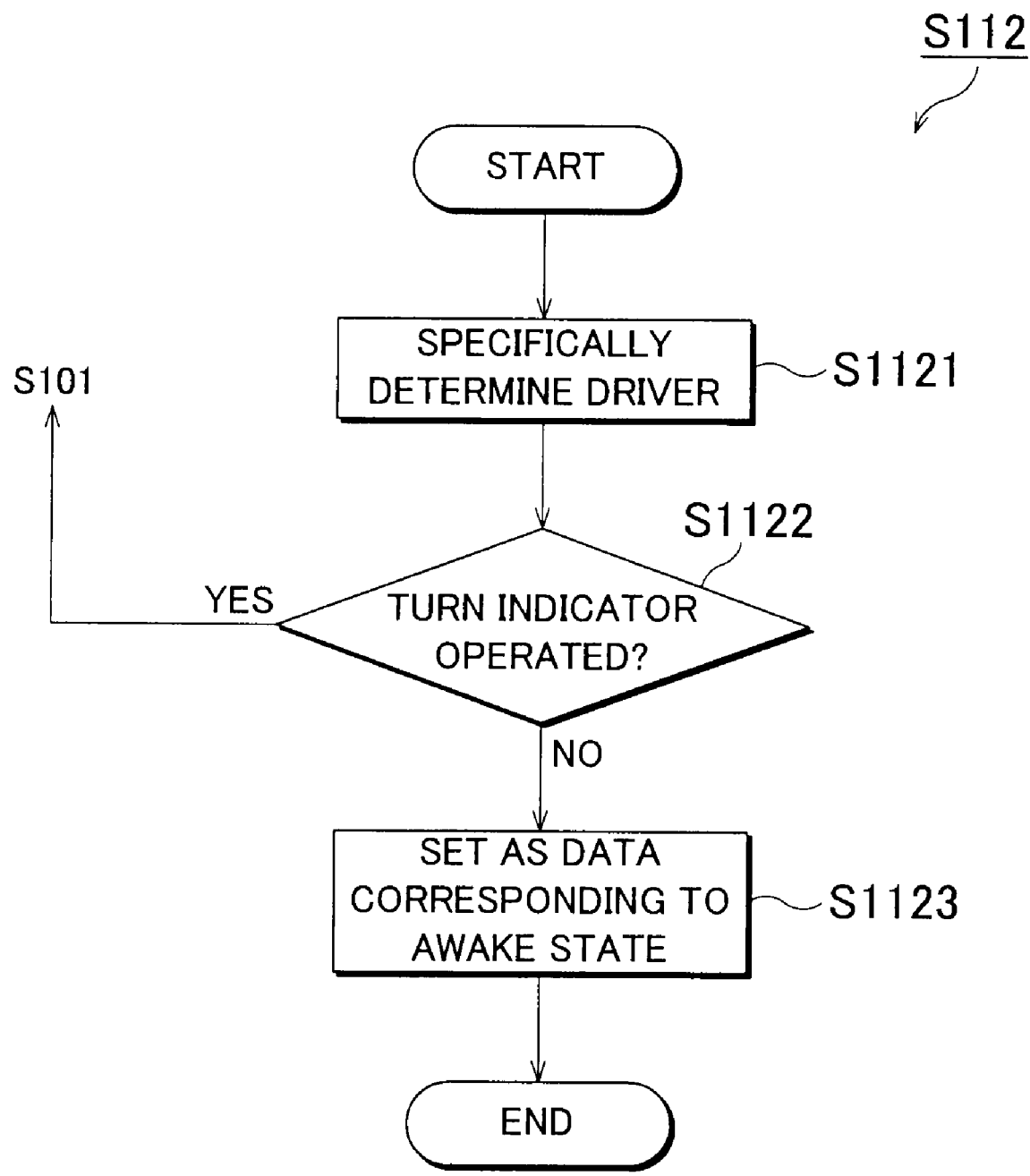

AWAKE STATE ESTIMATION DEVICE

INCORPORATION BY REFERENCE

The disclosure of Japanese Patent Application No. 2007-257272 filed on Oct. 1, 2007 including the specification, drawings and abstract is incorporated herein by reference in its entirety.

BACKGROUND OF THE INVENTION

1. Field of the Invention

The invention relates to an awake state estimation device and, more specifically, to an awake state estimation device that estimates an awake state of a driver of a mobile unit such as a motor vehicle or the like.

2. Description of the Related Art

In order to prevent a driver from falling asleep while driving, various awake state estimation devices for estimating an awake state of the driver have been devised. An awake state estimation device described in Japanese Patent Application Publication No. 9-277848 (JP-A-9-277848) estimates the awake state of a driver on the basis of a steering frequency obtained by analyzing a steering angle signal that shows the steering angle of the vehicle. Then, the awake state estimation device performs different estimation processes according to the type of the path on which the vehicle is traveling.

More concretely, when it has been determined that the path on which the vehicle is traveling is a straight path, the awake state estimation device determines the awake state of the driver on the basis of a peak value of the spectrum of the steering frequency and the magnitude of the peak frequency at which the peak value occurs. A reason for this is that when a vehicle is traveling on a straight path, the peak value of the steering spectrum and the frequency (peak frequency) at which the peak value occurs change greatly according to the awake state.

On the other hand, when it has been determined that the path on which the vehicle is traveling is a curved path, the awake state estimation device determines the awake state of the driver on the basis of an integrated value of the spectrum of a predetermined frequency band in the steering spectrum. A reason for this will be explained below. When a vehicle is traveling on a curved path, the peak frequency of the steering spectrum changes under the effect of the curvature of the curved path. Therefore, if the awake state is determined on the basis of the peak frequency as in the case where the vehicle is traveling on a straight path, an accurate awake state cannot be estimated. However, during the travel on a curved path, the integrated value of the spectrum of a predetermined frequency band greatly changes affected by the awake state not by the curvature of the curved path. Therefore, the awake state can be accurately estimated by estimating the awake state on the basis of the integrated value of the spectrum of a predetermined frequency band.

Then, after estimating the awake state of the driver, the awake state estimation device finds a moving average of numerical values that show the estimated awake state in a predetermined period of time, in order to absorb an instantaneous change of the awake state.

A technology different from the awake state estimation device described in Japanese Patent Application Publication No. 9-277848 (JP-A-9-277848) is a driving state detection device described in Japanese Patent Application Publication No. 11-342764 (JP-A-11-342764). The technology described in the Japanese Patent Application Publication No. 11-342764 (JP-A-11-342764) will be described below. Generally, a driver steers so that the vehicle travels on an ideal track. However, although the driver can steer the vehicle so that the vehicle travels on a substantially ideal road, it is impossible to steer so that the vehicle always travels on an ideal track. Therefore, the driver constantly corrects the traveling direction of the vehicle so that the vehicle travels on an ideal track, while driving the vehicle. The steering that the driver performs in order to constantly correct the traveling direction of the vehicle so that the vehicle travels on an ideal track is termed corrective steering. The technology described in Japanese Patent Application Publication No. 11-342764 (JP-A-11-342764) estimates a time-dependent change of the lateral acceleration that results from the ideal traveling track. Then, by eliminating the time-dependent change in the lateral acceleration estimated from an actual time-dependent change in the lateral acceleration that is measured by using the lateral acceleration sensor, a time-dependent change in the lateral acceleration that results only from the foregoing corrective steering is extracted. Then, the extracted time-dependent change in the lateral acceleration resulting only from the corrective steering is compared with a reference value determined beforehand, so as to detect a drowsy state of the driver. Besides, in the technology described in Japanese Patent Application Publication No. 11-342764 (JP-A-11-342764), the drowsy state of the driver may also be detected on the basis of the steering angle instead of the lateral acceleration.

However, the foregoing related technology has the following problems. Generally, the tendency in the foregoing corrective steering varies depending on drivers. More concretely, in the case where a vehicle is traveling on a curved path, the fluctuation of the corrective steering is small if the driver has good driving skill, and is larger if the driver has poor driving skill. If drivers vary in the driving skill, the result of estimation of the awake state is further affected by the traveling on a curved path. It is only natural that drivers vary in driving skill. That is, of the foregoing related technologies, the technology described in Japanese Patent Application Publication No. 9-277848 (JP-A-9-277848) is not capable of sufficiently restraining the effect that the travel of a vehicle on a curved path has on the result of estimation of the awake state. Besides, even in the case where a certain driver drives a certain vehicle, the tendency of the fluctuation of the corrective steering generally differs according to the kinds of curved paths on which the vehicle travels. Therefore, the effect that travel of the vehicle on a curved path has on the result of estimation of the awake state cannot be sufficiently restrained even by the technology described in Japanese Patent Application Publication No. 11-342764 (JP-A-11-342764) that detects the drowsy state of the driver by using the lateral acceleration which results only from the corrective steering, or the steering angle that results only from the corrective steering, that is, the foregoing corrective steering angle.

SUMMARY OF THE INVENTION

The invention provides an awake state estimation device that sufficiently restrains the effect that travel of a vehicle on a curved path has on the result of estimation of the awake state.

A first aspect of the invention relates to an awake state estimation device that estimates whether a driver of a vehicle is in an awake state or a non-awake state, based on steering angle of the vehicle. This awake state estimation device includes: traveling information acquisition means for acquiring, from the vehicle, traveling information that includes at least the steering angle and that changes according to a type of a traveling path on which the vehicle is moving; storage means for pre-storing correction value derivation information that includes a plurality of correction values associated by using the traveling information as a variable, and/or at least one correction value-calculating expression that derives a correction value by using the traveling information as a parameter; correction value setting means for setting the correction value corresponding to the traveling information based on the traveling information acquired by the traveling information acquisition means and the correction value derivation information stored in the storage means; corrective steering angle calculation means for calculating, as a corrective steering angle, a difference between the steering angle acquired by the traveling information acquisition means and an ideal steering angle with which for the vehicle to travel along an ideal traveling track of the vehicle based on the steering angle; corrective steering angle correction means for correcting the corrective steering angle calculated by the corrective steering angle calculation means, by using the correction value set by the correction value setting means; and awake state estimation means for estimating whether the driver is in the awake state or the non-awake state based on the corrective steering angle corrected by the corrective steering angle correction means.

In the awake state estimation device of the first aspect, the traveling information acquisition means may include ideal steering angular speed calculation means for calculating an ideal steering angular speed by time differentiation of the ideal steering angle with which for the vehicle to travel along the ideal traveling track of the vehicle based on the steering angle acquired, and the traveling information acquisition means may further acquire, as the traveling information, at least one of the ideal steering angular speed and the traveling speed of the vehicle.

Besides, the storage means may pre-store a plurality of correction values as a correction value map in which a plurality of ranges corresponding to at least one kind of the traveling information and divided based on predetermined magnitudes of a variable of the at least one kind of the traveling information are allotted with the types of traveling paths, and in which the plurality of ranges and the correction values are associated in correspondence with each other so that the traveling information and the plurality of correction values are associated with each other, and the correction value setting means may select from the plurality of ranges a rang that contains a value of the traveling information acquired by the traveling information acquisition means, and may set the correction value that is associated with the range.

Besides, the storage means may store standard deviations which are each a standard deviation of the corrective steering angles occurring when the vehicle is moving on a type of traveling path, and which are pre-calculated separately with respect to each of the types of traveling paths, and then are set as the correction values each associated with the traveling information, and the corrective steering angle correction means may perform a standardizing correction in which the corrective steering angle calculated by the corrective steering angle calculation means is standardized by dividing the corrective steering angle by the standard deviation of the corrective steering angle that is set as the correction value by the correction value setting means, and the awake state estimation means may estimate whether the driver is in the awake state or the non-awake state based on the corrective steering angle obtained after the standardizing correction and on a threshold value that is pre-determined based on the corrective steering angle occurring when the vehicle is traveling on one of the types of traveling paths.

The awake state estimation means may store the corrective steering angles obtained after the correction by the corrective steering angle correction means, during a pre-determined past period up to a present time point, and may calculate a standard deviation of all the post-correction corrective steering angles occurring during a past period of time of a pre-determined first window length immediately preceding the present time point which are extracted from a history of the post-correction corrective steering angles stored, and may estimate that the driver is in the non-awake state if the standard deviation value is greater than or equal to the threshold value.

Besides, the awake state estimation device may further include: synchronization process means for performing a coincidence process in which a time of acquisition of the steering angle, the ideal steering angular speed and the traveling speed that are contained in the traveling information acquired by the traveling information acquisition means during a predetermined correction value calculation period is caused to coincide with a time of calculation of the corrective steering angle calculated based on the steering angle, and for causing the variable defining the plurality of ranges which is extracted from three variables of the steering angle, the ideal steering angular speed and the traveling speed that are obtained after the coincidence process and the corrective steering angle obtained after the coincidence process to correspond to each other; and correction value calculation means for setting as the plurality of correction values a plurality of standard deviations which are each a standard deviation of the corrective steering angles that are caused to coincide in time with the variable having a magnitude contained in one of the ranges by the synchronization process means, and which are calculated separately for each of the ranges, and for associating the traveling information and the plurality of correction values with each other by associating the plurality of correction values and all the ranges in correspondence with each other, and storing the traveling information and the correction values associated with each other.

The storage means may store as the plurality of correction values the correction value map of three dimensions in which a plurality of ranges divided based on predetermined magnitudes of three variables of the steering angle, the ideal steering angular speed and the traveling speed are allotted with the types of traveling paths, and in which the plurality of ranges and the correction values are associated in correspondence with each other so that the traveling information and the plurality of correction values are associated with each other.

The corrective steering angle calculation means may store the steering angles that are acquired by the traveling information acquisition means during a pre-determined past period up to a present time point, and may calculate as the ideal steering angle an average value of all the steering angles occurring during a period of time of a second window length immediately preceding the present time point which are extracted from a history of the steering angles stored, and the corrective steering angle calculation means may set the second window length shorter with increase in a width of fluctuation of the steering angles acquired by the traveling information acquisition means, and may set the second window length longer with decrease in the width of fluctuation of the steering angles.

The awake state estimation device may further include driver specific determination means for specifically determining the driver, and the storage means may pre-store a plurality of said correction value maps that correspond to each driver, and the correction value setting means may set one of the plurality of correction values associated with the traveling information that the traveling information acquisition means acquires by the correction value map that corresponds to the driver specifically determined by the driver specific determination means.

In the awake state estimation device, the awake state estimation device may set a period of a pre-determined length of time from turning-on of an ignition switch of the vehicle as the correction value calculation period.

The storage means may pre-store a correction value derivation expression for deriving the correction value, and the correction value setting means may set as the correction value a value calculated by substituting the traveling information acquired by the traveling information acquisition means as a parameter in the correction value derivation expression stored in the storage means.

The traveling information acquisition means may include ideal steering angular speed calculation means for calculating an ideal steering angular speed by time differentiation of the ideal steering angle with which for the vehicle to travel along the ideal traveling track of the vehicle based on the steering angle acquired, and the traveling information acquisition means may further acquire, as the traveling information, at least one of the ideal steering angular speed and the traveling speed of the vehicle, and the awake state estimation device may include correction value calculating expression derivation means for updating the correction value-calculating expression stored in the storage means in a pre-determined update period, by deriving at least one correction value-calculating expression by using the traveling information acquired by the traveling information acquisition means and the corrective steering angle calculated by the corrective steering angle calculation means, and the correction value setting means, in a period other then the update period, may set as the correction value a value calculated by substituting the traveling information acquired by the traveling information acquisition means as a parameter in the correction value-calculating expression having been updated that is stored in the storage means.

A second aspect of the invention relates to an awake state estimation method that estimates whether a driver of a vehicle is in an awake state or a non-awake state, based on steering angle of the vehicle. This awake state estimation method includes the step of acquiring the steering angle of the vehicle, the step of acquiring, from the vehicle, traveling information that changes according to a type of a traveling path on which the vehicle is moving, the step of pre-storing correction value derivation information for setting a correction value associated with the traveling information, the step of setting the correction value corresponding to the traveling information based on the traveling information and the correction value derivation information, the step of calculating, as a corrective steering angle, a difference between the steering angle and an ideal steering angle with which for the vehicle to travel along an ideal traveling track of the vehicle based on the steering angle, the step of correcting the corrective steering angle by using the correction value, and the step of estimating whether the driver is in the awake state or the non-awake state based on the corrective steering angle corrected.

In the awake state estimation method, the correction value derivation information may include at least one of a correction value associated by using the traveling information as a variable, and a correction value-calculating expression that derives a correction value by using the traveling information as a parameter.

According to the invention, on the traveling information that changes depending on traveling paths on which the vehicle is moving, the corrective steering angle set for each of the traveling paths is corrected. Then, on the basis of the post-correction corrective steering angle, the driver's awake state is estimated. Therefore, the influence that the travel of the vehicle along a curved path has on the result of estimation of the awake state can be sufficiently restrained.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 8 is a block diagram showing a general construction of an awake state estimation device in accordance with a first embodiment;

FIG. 10A is a diagram illustrating a window length provided for calculating an average steering angle;

FIG. 10B is a diagram illustrating a window length provided for calculating an average steering angle;

FIG. 12 is a flowchart showing a process performed by the awake state estimation portion in accordance with the first embodiment;

FIG. 13 is a flowchart showing a process performed by the awake state estimation portion in accordance with the first embodiment;

DETAILED DESCRIPTION OF THE EMBODIMENTS

First Embodiment

In an embodiment of the invention, the steering angle of a steering handle that is changed by the steering operation of a driver is divided into three kinds. A first kind of steering angle is the absolute steering angle that is the rotation angle of the steering handle. A second kind of steering angel is the corrective steering angle that shows the steering angle that is changed by the corrective steering. A third kind of steering angle is an ideal steering angle that is a difference between the foregoing absolute steering angle and the foregoing corrective steering angle.

Figure 1:
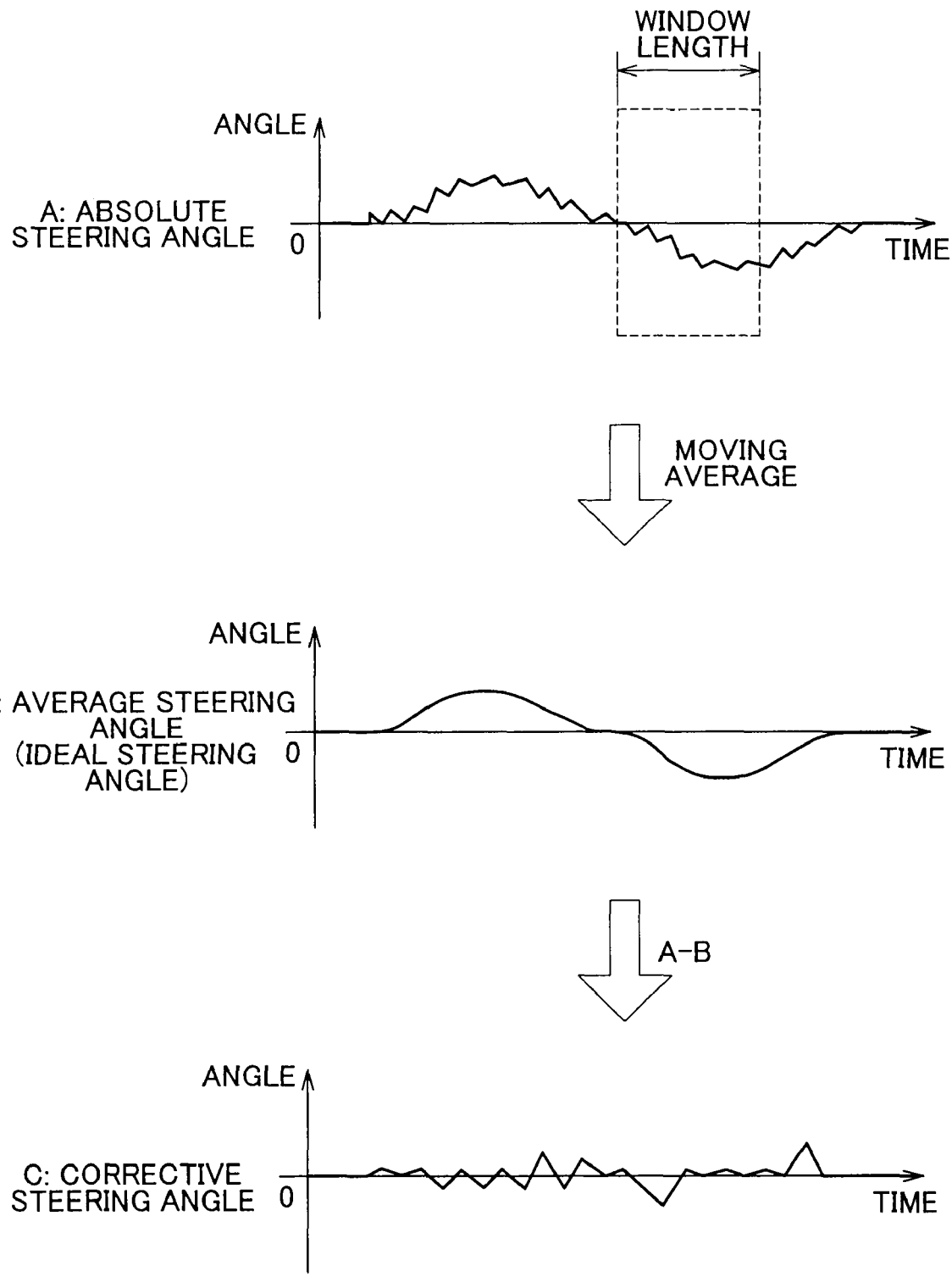
FIG. 1 is a diagram illustrating the corrective steering angle in the invention.

An awake state estimation device in accordance with this embodiment estimates the awake state of a driver on the basis of the corrective steering angle, of the three kinds of steering angle. FIG. 1 is a diagram illustrating a method of calculating the foregoing corrective steering angle on the basis of the rotation angle of the steering wheel, that is, the foregoing absolute steering angle. As shown in FIG. 1, the corrective steering angle can be found by calculating a difference between the absolute steering angle and the moving average of the absolute steering angle (i.e., an absolute steering angle obtained through the extraction process, which will be hereinafter referred to as average steering angle). The average steering angle is an angle that corresponds to the foregoing ideal steering angle. Incidentally, it is noted herein that the width of fluctuation of the corrective steering angle is smaller than the width of fluctuation of the ideal steering angle occurring when the vehicle travels along an ideal track. Besides, although in this embodiment, the three kinds of steering angle are based on the rotation angle of the steering handle, the three kinds of steering angle may instead be based on the rotation angle of road wheels that is changed by operating the steering handle.

Next, the tendency of fluctuations of the corrective steering angle will be described. The corrective steering angle fluctuates with the elapse of the time in which the driver drives the vehicle by operating the steering handle. Then, the tendency of fluctuations of the corrective steering angle has a certain degree of periodicity. Besides, the tendency of fluctuations of the corrective steering angle changes between when the driver is awake and when the driver's consciousness is low. More concretely, the tendency of fluctuations of the corrective steering angle when the driver is awake is small in the periodicity of fluctuations and small in the width of fluctuations. On the other hand, when the driver's consciousness is low, that is, when the awake state of the driver is low, the tendency of fluctuations of the corrective steering angle is large in the periodicity of fluctuations and large in the width of fluctuations.

Next, an outline of the method of estimating the awake state on the basis of the tendency of fluctuations of the corrective steering angle will be described. As described above, the tendency of fluctuations of the corrective steering angle differs between when the driver is awake and when the driver's awake state is low. Therefore, it is possible to conceive a method in which the variation (width of fluctuation) of the corrective steering angles in a period determined beforehand, that is, the standard deviation of corrective steering angles in the period, is calculated, and when the calculated standard deviation is greater than or equal to a predetermined threshold value, it is estimated that the driver's awake state has declined. However, since vehicles generally travel on straight paths and curved paths, the foregoing estimation method does not make it possible to estimate the decline of the driver's awake state with a preferable accuracy. A reason for this is that the tendency of fluctuations of the corrective steering angle differs also between when the vehicle travels on a straight path and when the vehicle travels on a curved path. Therefore, regardless of whether the vehicle is traveling on a straight path or a curved path, the calculated standard deviation of the corrective steering angle is not a value that reflects only the driver's awake state, but a value that depends also on whether the vehicle is traveling on a curved path. That is, the foregoing estimation method cannot sufficiently restrain the effect that travel of a vehicle on a curved path has on the result of estimation of the awake state.

This awake state estimation device in accordance with the embodiment corrects the corrective steering angle calculated during the running of the vehicle, and compares the standard deviation of the post-correction corrective steering angles with a threshold value determined beforehand, thereby restraining the effect that travel of the vehicle on a curved path has on the result of estimation of the awake state. More concretely, the awake state estimation device in accordance with this embodiment corrects the corrective steering angle that the driver makes when driving the vehicle along a straight path, with a correction value that factors in the tendency of fluctuations of the corrective steering angle that the driver makes when driving the vehicle along a straight path. Besides, the device corrects the corrective steering angle that the driver makes when driving the vehicle along a curved path, with a correction value that factors in the tendency of fluctuations of the corrective steering angle that the driver makes when driving the vehicle along a curved path. That is, the awake state estimation device in accordance with the embodiment corrects the corrective steering angle by a correction value commensurate with the type of the path on which the vehicle is traveling. Then, the moving standard deviation of the post-correction corrective steering angle in a period determined beforehand is calculated, and then is compared with a threshold value.

It is to be noted that when the corrective steering angle is to be corrected, it is insufficient to merely correct the corrective steering angle by two correction values commensurate with the straight path and the curved path, respectively, in order to restrain the effect that travel of the vehicle on a curve road has on the result of estimation of the awake state. A reason for this is that even when a vehicle travels on a certain curved path, the tendency of fluctuations of the corrective steering angle differs deepening where along the curved path the vehicle is traveling, that is, differs among "the point of entrance into and the point of exit from the curved path", "the point at which the curvature is the greatest", "the sections between the entrance point and the exist point of the curved path and the point at which the curvature is the largest".

Therefore, in the awake state estimation device in accordance with the invention, the types of traveling path are further minutely classified into "the straight path", "the entrance point and the exist point of a curved path", "the point of the greatest curvature", and "the sections between the entrance or exit point of a curved path and the point of the greatest curvature". Then, the awake state estimation device in accordance with the embodiment specifically determines the type of the traveling path on which the vehicle is presently running, of the foregoing types of traveling paths, on the basis of traveling information, including the absolute steering angle, the average steering angle, the average steering angular speed, etc. Then, the awake state estimation device individually corrects the corrective steering angle on the specifically determined type of the traveling path with a correction value that is calculated beforehand according to the type of the traveling path. Then, the awake state estimation device calculates a moving standard deviation of the post-correction corrective steering angle in a period of time determined beforehand, and compares the moving standard deviation with a threshold value. Incidentally, the types of traveling paths to be taken into account in the invention are not limited to "the straight path", "the entrance point and the exist point of a curved path", "the point of the greatest curvature", and "the sections between the entrance or exit point of a curved path and the point of the greatest curvature" mentioned above, but it is also permissible to take into account other types of traveling paths about which it is considered preferable to perform the individual correction of the corrective steering angle.

Figure 6:
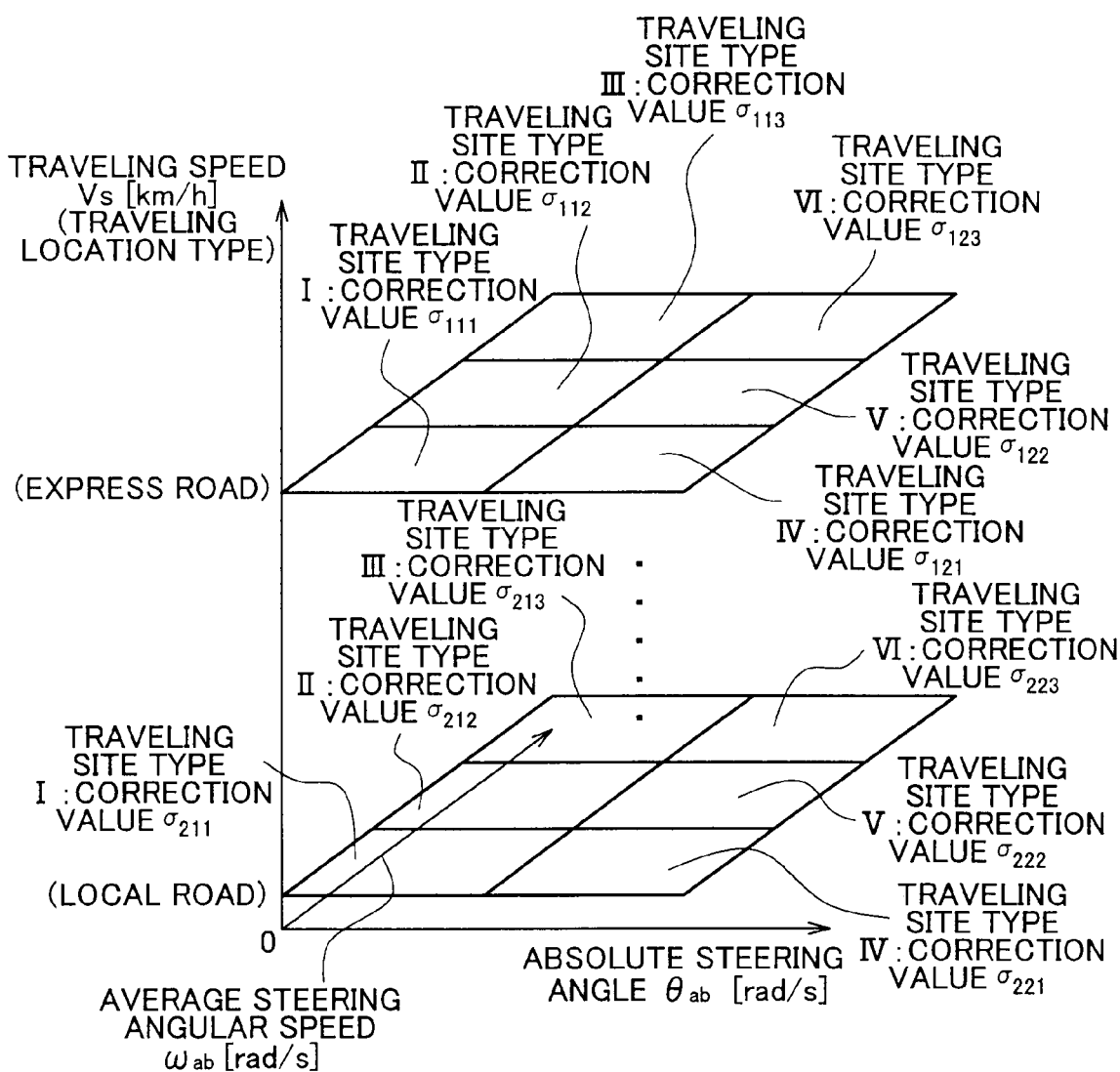
FIG. 6 is a diagram showing an example of a correction value map.

Incidentally, the awake state estimation device in accordance with the embodiment is able to estimate the awake state with a sufficient accuracy by calculating a correction value according to each type of traveling path and correcting the corrective steering angle through the use of the specifically calculated correction value. Besides, it is also permissible to take into account the fact that the tendency of fluctuations of the corrective steering angle changes also depending on the types of traveling locations such as local roads, express roads, etc. The types of traveling paths as mentioned above may also be further classified by factoring in the types of traveling locations. That is, the foregoing types of traveling paths may be more minutely classified, for example, into "the straight path of a local road", "the straight path of an express road", "the entrance point of a curved path of a local road", "the entrance point of a curved path of an express road", etc. Then, it is also permissible to calculate as a correction value the standard deviation of the corrective steering angle commensurate with each of the types of traveling paths that are minutely classified by factoring in the types of traveling locations. When the awake state estimation device according to the embodiment further minutely classifies the types of traveling paths by factoring in the types of traveling locations, and calculates a correction value according to each type of traveling path, the awake state estimation device uses a correction value map. This correction value map may be a three-dimensional correction value map as shown in FIG. 6. Incidentally, in the invention, the foregoing type of traveling location, that is, a local road, an express road, etc., can be specifically determined. FIG. 6 is a diagram showing that correction values correspond individually to a plurality of ranges that are determined beforehand according to the magnitudes of the traveling speed (type of traveling location), the absolute steering angle and the average steering angular speed. Details of the correction value map shown in FIG. 6 will be described later.

What has been described above is an outline of the method of estimating the awake state of a driver of the invention. Next, an outline of the operation of the awake state estimation device according to the embodiment will be described.

The awake state estimation device in accordance with a first embodiment firstly acquires a detected absolute steering angle. Then, the awake state estimation device finds a moving average of the acquired steering angles to calculate an average steering angle described above. Then, after calculating the average steering angle, the awake state estimation device calculates an average steering angular speed by differentiating the calculated average steering angle with respect to time. Furthermore, the awake state estimation device in accordance with the embodiment finds a difference between the acquired steering angle and the calculated average steering angle to calculate a corrective steering angle. Next, the awake state estimation device acquires a detected traveling speed. Then, after acquiring the traveling speed, the absolute steering angle, the average steering angle, the average steering angular speed, and the corrective steering angle, the awake state estimation device in accordance with the embodiment performs a synchronization process of causing the time of acquisition of the traveling speed, the time of calculation of the corrective steering angle, the time of calculation of the average steering angular speed, and the time of acquisition of the absolute steering angle to coincide with one another. Then, three of the post-synchronization variables, that is, the post-synchronization absolute steering angle, the post-synchronization average steering angular speed, and the post-synchronization traveling speed, are associated in a correspondence relation with the post-synchronization corrective steering angle. This association in a correspondence relation is always performed during a period in which the steering angle is being acquired, regardless of whether it is when the driver is awake or when the awake state of the driver is to be estimated.

Next, the awake state estimation device in accordance with the embodiment determines whether or not the driver is awake. A method of this determination will be described later together with the description of a process of steps S110 and S111 shown in FIG. 9. Then, during a period in which it is considered, as a result of the determination, that the driver is awake, the awake state estimation device calculates a correction value that corresponds to each of the foregoing types of traveling paths on the basis of the post-synchronization corrective steering angle. This correction value is a standard deviation value of corrective steering angles occurring when the vehicle travels while the driver is awake, the standard deviation value being obtained with respect to each of the types of traveling paths. In the awake state estimation device in accordance with the embodiment, since the standard deviation values of corrective steering angles on the individual types of traveling paths on which the vehicle travels while the driver is awake are calculated as correction values, these correction values become correction values commensurate with the foregoing types of traveling paths. Herein, a method of calculating a correction value commensurate with each type of traveling path, that is, a standard deviation of corrective steering angles commensurate with each type of traveling path, will be described. In order to calculate a correction value commensurate with each type of traveling path, the awake state estimation device in this embodiment firstly makes the type of the traveling path on which the vehicle has been traveling correspond to each of the absolute steering angle, the average steering angular speed and the traveling speed.

Hereinafter, a method of making the type of the traveling path through which the vehicle has traveled correspond to each of the absolute steering angle, the average steering angular speed and the traveling speed will be described.

Figure 2:
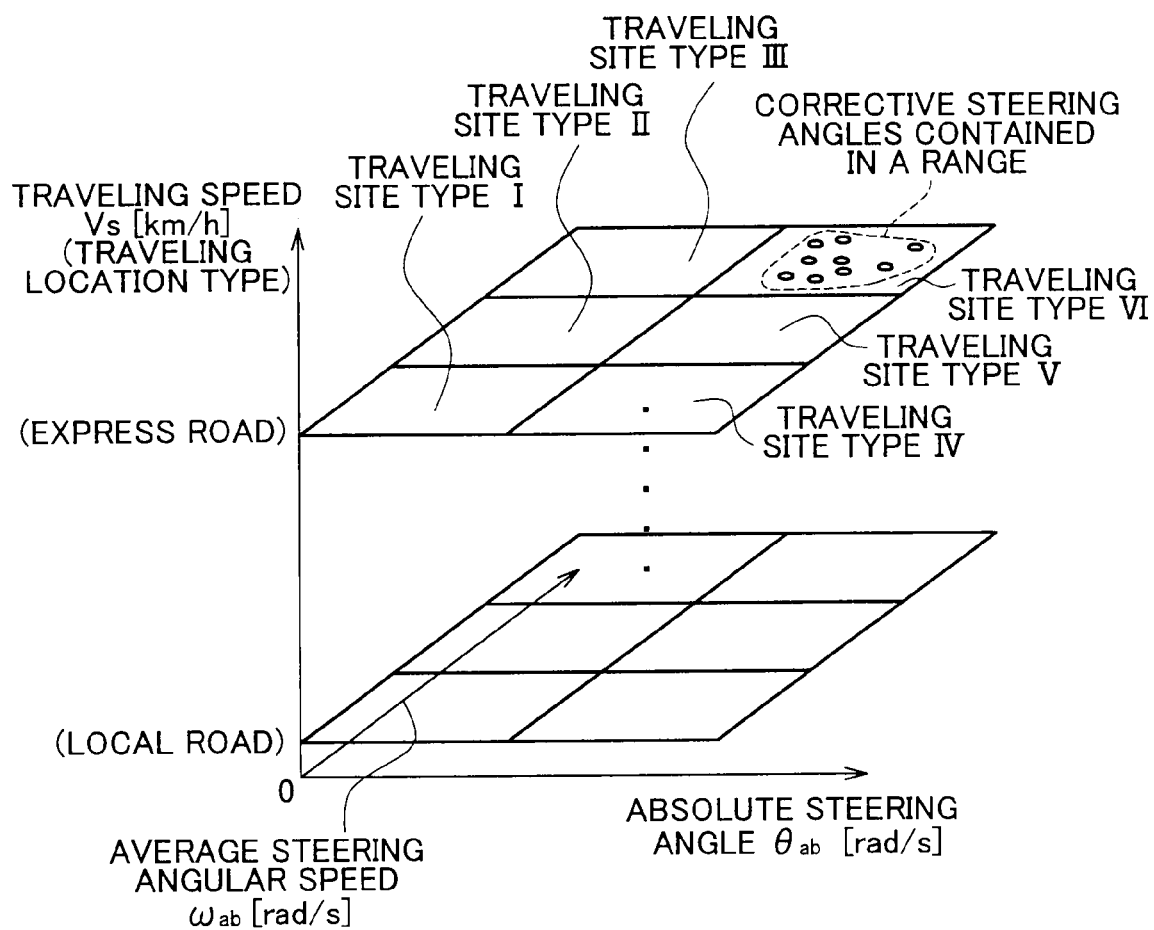
FIG. 2 is a diagram showing a correspondence relation among an absolute steering angle, an average steering angular speed, a traveling speed, and the types of traveling site.

FIG. 2 is a diagram showing an example of a traveling speed-steering angle-average steering angular speed scatter diagram that associates the type of traveling path in a correspondence relation with the three variables, that is, the absolute steering angle, the average steering angular speed and the traveling speed. In conjunction with the embodiment, the case where the three variables, that is, the post-synchronization absolute steering angle, the post-synchronization average steering angular speed and the post-synchronization traveling speed, are each associated in a correspondence relation with the post-synchronization corrective steering angle, and a correction value commensurate with each type of traveling path is calculated, is described as an example. Therefore, the traveling speed-steering angle-average steering angular speed scatter diagram shown in FIG. 2 is a three-dimensional scatter diagram in which a plurality of steering angle-average steering angular speed planes each of which corresponds to a certain traveling speed (a type of traveling location) are superimposed on each other according to the traveling speeds (types of traveling locations). However, in order to facilitate the description, the case where the type of the traveling path on which the vehicle has been traveling is made to correspond to two variables, that is, the absolute steering angle and the average steering angular speed, will be described as an example. Incidentally, although FIG. 2 shows two steering angle-average steering angular speed planes each of which has six ranges, the number of ranges in a steering angle-average steering angular speed plane may be other than six, and the number of steering angle-average steering angular speed planes may also be other than two.

Figure 3:
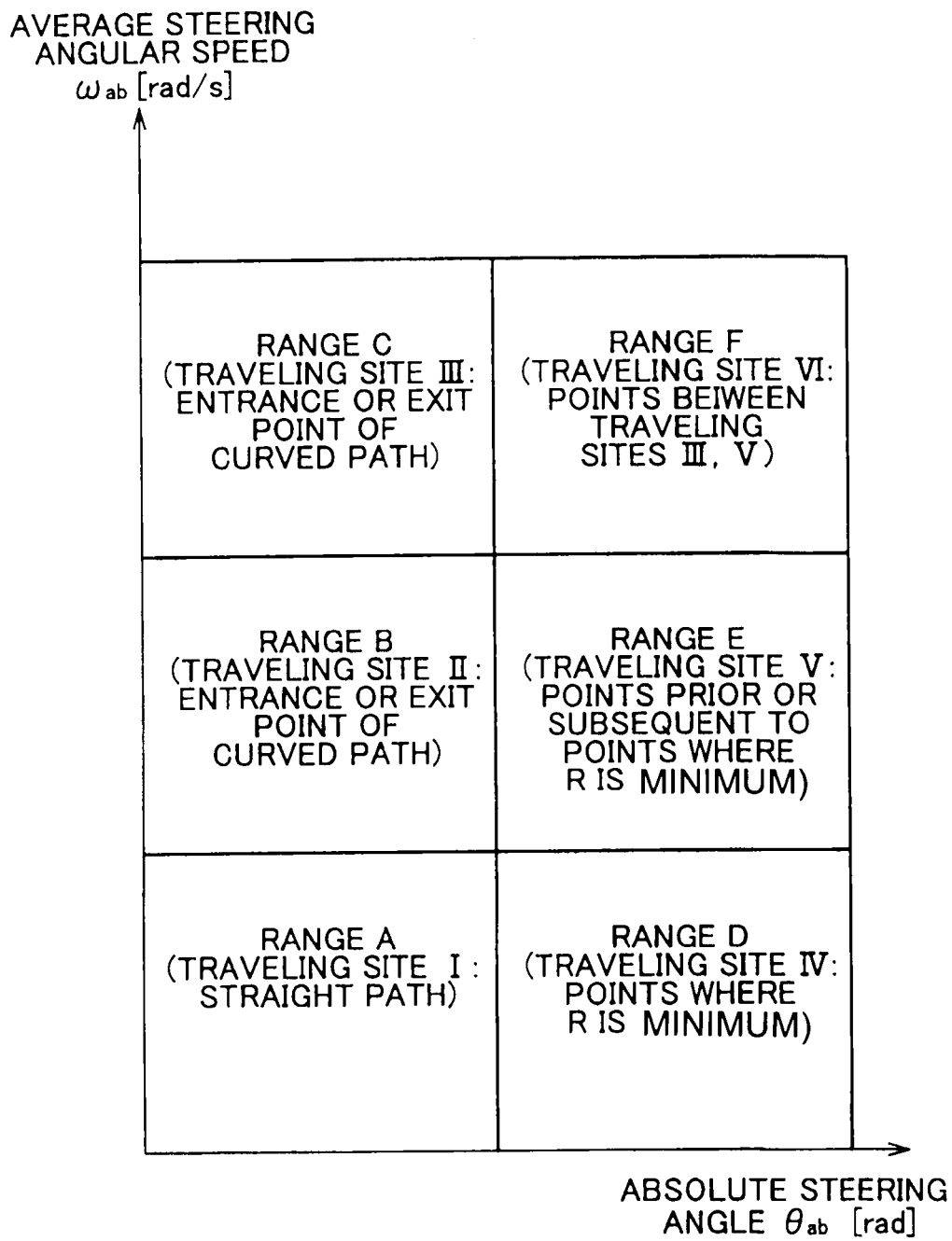
FIG. 3 is a diagram illustrating a method of specifically determining the type of traveling site.

FIG. 3 is a diagram showing one of the steering angle-average steering angular speed planes in the three-dimensional scatter diagram of FIG. 2 which corresponds to a certain traveling speed. As can be understood from the division of a steering angle-average steering angular speed plane into a plurality of ranges A to F (types I to IV of traveling sites) as shown in FIG. 3, the use of the steering angle-average steering angular speed plane makes it possible to associate each of the two variables, that is, the absolute steering angle and the average steering angular speed, in a correspondence relation with the types of traveling paths. A reason for this will be explained below.

First, the range A in the scatter diagram of FIG. 3 will be described. When the vehicle is traveling along a straight path, the ideal traveling track is a straight line, and therefore the driver needs only to perform corrective steering. That is, the average steering angle calculated when the vehicle is traveling on a straight path remains substantially unchanged, and only the corrective steering angle mainly changes. As described above, the width of fluctuation of the corrective steering angle is smaller than the width of fluctuation of the average steering angle. Besides, as described above, the width of fluctuation of the absolute steering angle detected when the vehicle is traveling on a straight path is relatively small since the absolute steering angle is the sum of the average steering angle and the corrective steering angle. A small width of fluctuation of the absolute steering angle means that data gather into a small range of the absolute steering angle in FIG. 3. Besides, when during a travel of the vehicle on a straight path, the average steering angle remains substantially unchanged, the average steering angular speed obtained by differentiating the average steering angle is also small. Therefore, a combination of the absolute steering angle and the average steering angular speed falling in the range A of the scatter diagram shown in FIG. 3 shows that the vehicle is traveling on a straight path.

Next, the ranges B and C in the scatter diagram of FIG. 3 will be described. The time when the vehicle travels through the entrance point and the exist point of a curved path is when the vehicle travels through a beginning point of the change of the traveling track of the vehicle from a straight line to a curved line or from a curved line to a straight line. Therefore, the corrective steering angle does not greatly change, but the foregoing average steering angle changes. Then, since the vehicle is traveling through the beginning point of the change, the average steering angular speed obtained by differentiating the average steering angle is considered to become large. Therefore, a combination of the absolute steering angle and the average steering angular speed falling in the range B or C in the scatter diagram shown in FIG. 3 shows that the vehicle is traveling through the entrance point or the exit point of a curved path.

Next, the range D in the scatter diagram of FIG. 3 will be described. The absolute steering angle is considered to become large at a point at which the radius of curvature of a curved path is the smallest, that is, a point along a curved path at which the curve is the sharpest. Besides, the average steering angular speed is considered to become small. Therefore, a combination of the absolute steering angle and the average steering angular speed falling in the range D in the scatter diagram shown in FIG. 3 shows that the vehicle is traveling through a point at which the radius of curvature of a curved path is the smallest.

Next, the range E in the scatter diagram of FIG. 3 will be described. The absolute steering angle considered to become large at points prior or subsequent to a point at which the radius of curvature of a curved path is the smallest, that is, at points prior or subsequent to a point along a curved path at which the curve is the sharpest. Besides, the average steering angular speed is considered to become larger than the range D. Therefore, a combination of the absolute steering angle and the average steering angular speed falling in the range E in the scatter diagram shown in FIG. 3 shows that the vehicle is traveling through a point prior or subsequent to a point of the smallest radius of curvature of a curved path.

Next, the range F in the scatter diagram of FIG. 3 will be described. Both the absolute steering angle and the average steering angular speed are considered to become large values at intermediate points along a curved path, that is, at points between the foregoing points prior or subsequent to the point of the smallest radius of curvature of a curved path and the entrance and exist points of the curved path. Therefore, a combination of the absolute steering angle and the average steering angle falling in the range F in the scatter diagram shown in FIG. 3 shows that the vehicle is traveling through a point between a point prior or subsequent to the point of the smallest radius of curvature of a curved path and the entrance or exist point of the curved path.

In this manner, the use of the steering angle-average steering angular speed plane makes it possible to make the absolute steering angle and the average steering angular speed correspond to the type of the traveling path along which the vehicle has traveled. Furthermore, by specifically determining one of the steering angle-average steering angular speed planes shown in FIG. 2 according to the traveling speed, the type of the traveling path on which the running vehicle is present can be made to correspond to the absolute steering angle, the average steering angular speed and the traveling speed. What has been described above is a method of making the type of the traveling path along which the vehicle has traveled correspond to each of the absolute steering angle, the average steering angular speed and the traveling speed.

Next, how the ranges in the steering angle-average steering angular speed plane shown in FIG. 3 correspond to points along a curved path will be concretely described with a U-shaped road and an S-shaped road used as examples. FIGS. 4A to 4D are diagrams showing correspondences between the traveling point, the absolute steering angle, the average steering angular speed, and the ranges of steering angle-average steering angular speed shown in FIG. 3 which change with the elapse of time when a vehicle travels through a U-shaped road.

Figure 4A:
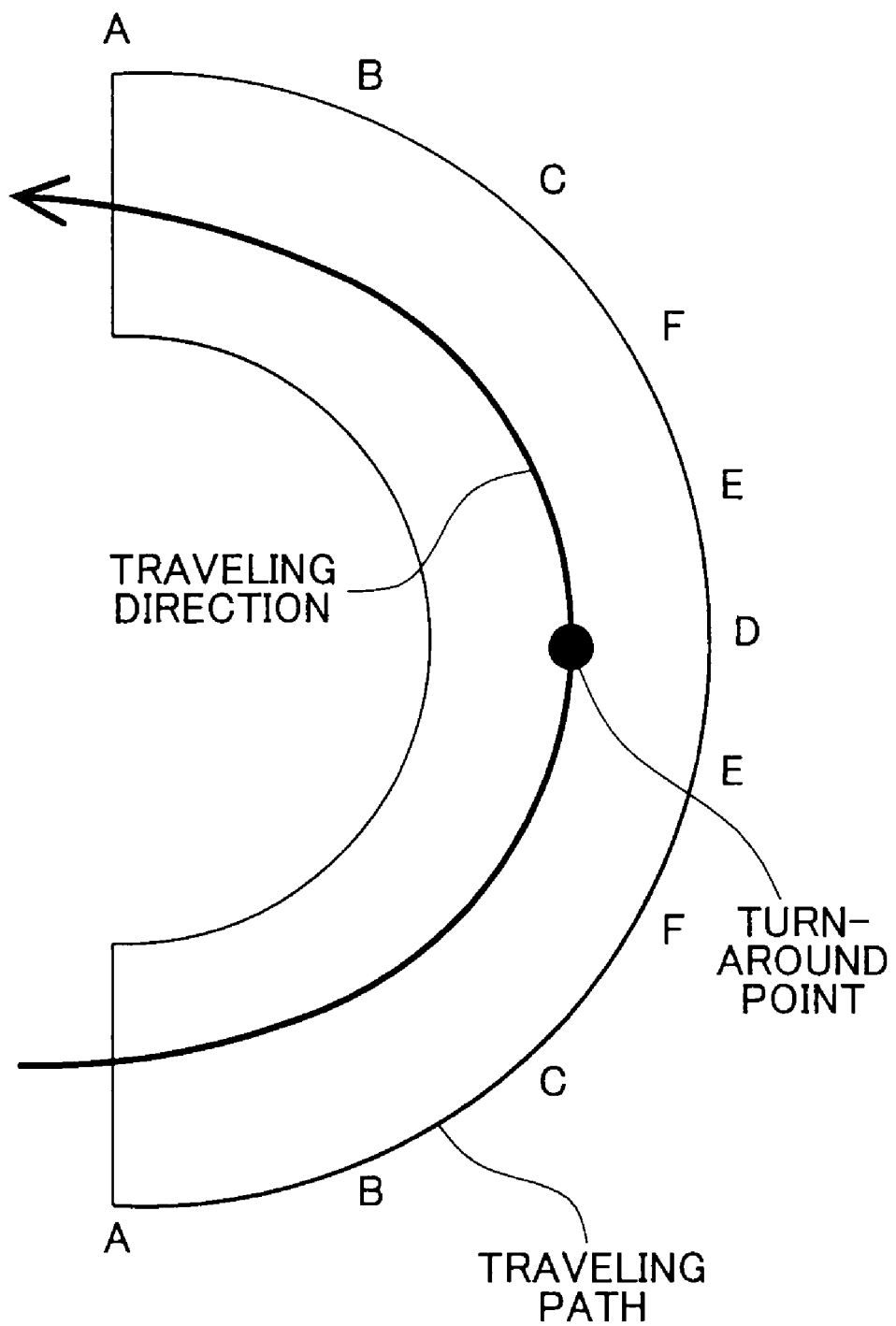
FIG. 4A is a diagram showing an example of a U-shaped road.

FIG. 4A is a diagram showing the correspondence between points along a U-shaped road (curved path) along which the vehicle travels in a traveling direction shown in FIG. 4A and the ranges (A to F) of steering angle-average steering angular speed plane. As shown in FIG. 4A, the correspondence relation between traveling points and the foregoing ranges along a U-shaped road changes with the elapse of time as in A→B→C→F→E→D→E→F→C→B→A. A reason for this will be explained below.

Figure 4B:
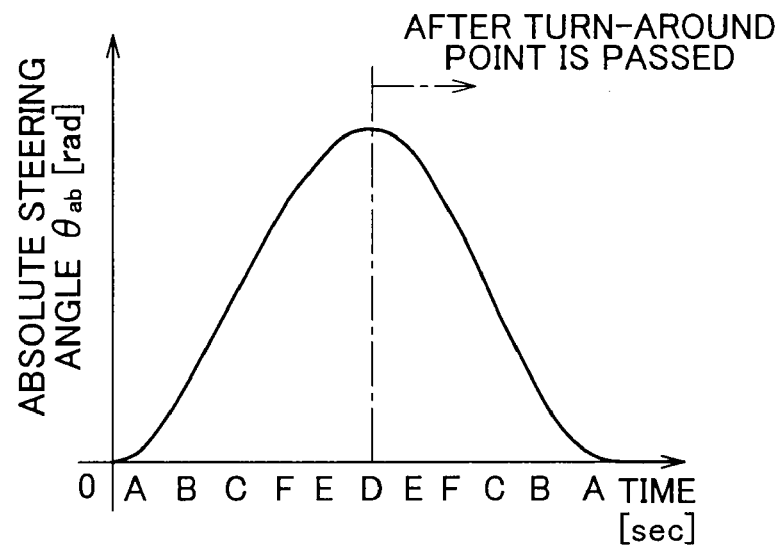
FIG. 4B is a diagram showing changes in the absolute steering angle occurring when a vehicle travels through a U-shaped road.
Figure 4C:
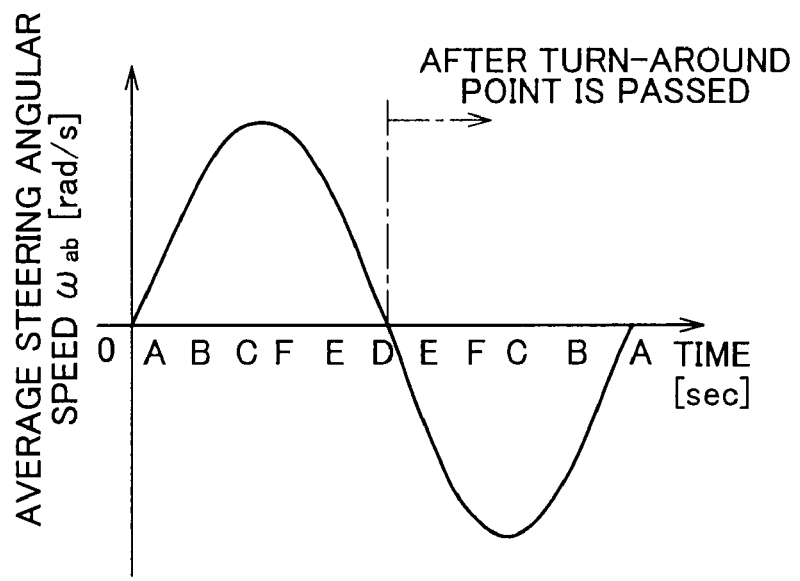
FIG. 4C is a diagram showing changes in the average steering angular speed occurring when a vehicle travels through a U-shaped road.

FIG. 4B is a diagram showing changes in the absolute steering angle with the elapse of time when a vehicle travels through the U-shaped road in the traveling direction shown in FIG. 4A. In FIG. 4B, the foregoing ranges (A to F) corresponding to the magnitude of the absolute steering angle are shown. As shown in FIG. 4B, the change in the absolute steering angle when the vehicle travels through the U-shaped road as shown in FIG. 4A begins to increase from zero with the elapse of time when the vehicle starts passing through the U-shaped road, and begins to decrease when the vehicle passes through a turn-around point shown in FIG. 4A, and becomes zero again when the passage through the U-shaped road ends. FIG. 4C is a diagram showing changes in the average steering angular speed with the elapse of time when the vehicle travels through the U-shaped road in the traveling direction shown in FIG. 4A. In FIG. 4C, the foregoing ranges (A to F) corresponding to the magnitude of the average steering angular speed are shown. As shown in FIG. 4C, the average steering angular speed of the vehicle traveling through the U-shaped road as shown in FIG. 4A begins to increase from zero when the vehicle starts passing through the U-shaped road, and then changes in substantially the same fashion as a sine wave with its point of intersection with the axis of time being the time point at which the vehicle passes through the turn-around point shown in FIG. 4A.

Figure 4D:
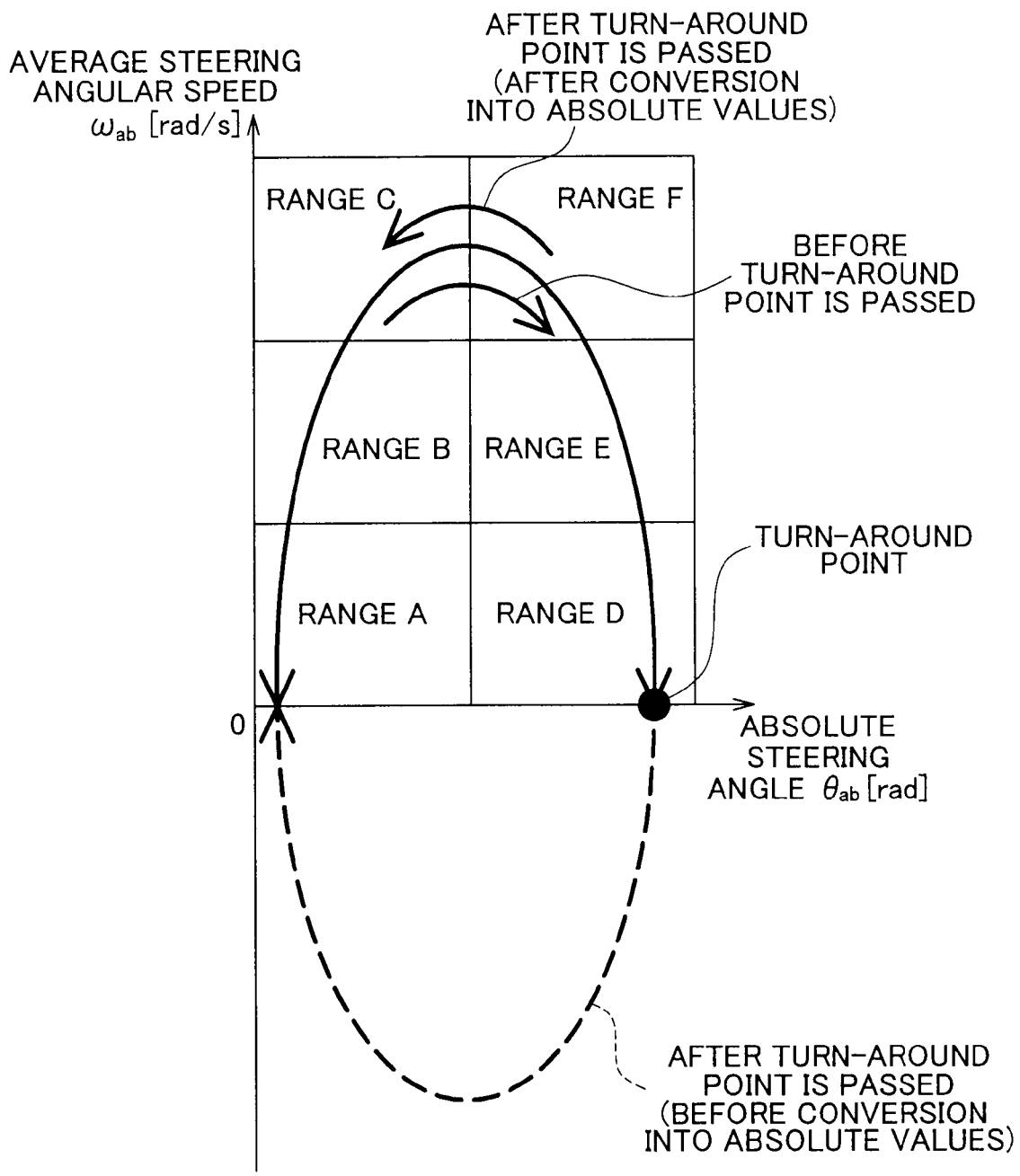
FIG. 4D is a diagram showing a steering angle-average steering angular speed plane at the time of traveling through a U-shaped road.

FIG. 4D is a diagram in which a locus of the vehicle traveling through the U-shaped road in the traveling direction as shown in FIG. 4A which is obtained from the absolute steering angle (FIG. 4B) and the average steering angular speed (FIG. 4C) that change with the travel of the vehicle is shown according to the elapse of time in the steering angle-average steering angular speed plane shown in FIG. 3. The locus determined by the absolute steering angle and the average steering angular speed of the vehicle traveling through the U-shaped road begins with the range A as shown in FIG. 4D, and reaches the range D through the ranges G, C, F and E. After that, a locus obtained by inverting the locus up to the range D about the axis of time occurs. This is because the average steering angular speed becomes negative values as shown in FIG. 4C after the vehicle passes through the turn-around point shown in FIG. 4A. However, in this embodiment, the steering angle-average steering angular speed plane as shown in FIGS. 3 and 4D is defined only in a region in which the steering angle and the average steering angular speed both become positive values.

Therefore, in order that a portion of the locus shown in FIG. 4D that occurs after the vehicle passes through the turn-around point should be made to correspond to the foregoing ranges A to F, a process of converting the absolute steering angle and the average steering angular speed into absolute values is performed in this embodiment. This makes it possible to make the absolute steering angle and the average steering angular speed correspond to the foregoing ranges even when at least one of the absolute steering angle and the average steering angular speed becomes negative in value. More concretely, in this embodiment, by performing the foregoing absolute value conversion process, the portion of the locus shown in FIG. 4D that occurs after the vehicle passes through the turn-around point shown in FIG. 4A is converted into a locus obtained by inverting a portion of the locus shown by a broken line with respect to the axis of time, so that the locus can be made to correspond to the foregoing ranges. Besides, since the foregoing absolute value conversion process is performed, the correspondence relation between the traveling point and the foregoing ranges when the vehicle travels through the U-shaped road shown in FIG. 4A changes as in A→B→C→F→E→D→E→F→C→B→A with the elapse of time.

Next, with reference to FIGS. 5A to 5D, correspondences between the traveling point, the absolute steering angle, the average steering angular speed and the foregoing ranges of a vehicle that change with the elapse of time when the vehicle travels through an S-shaped road will be described.

Figure 5A:
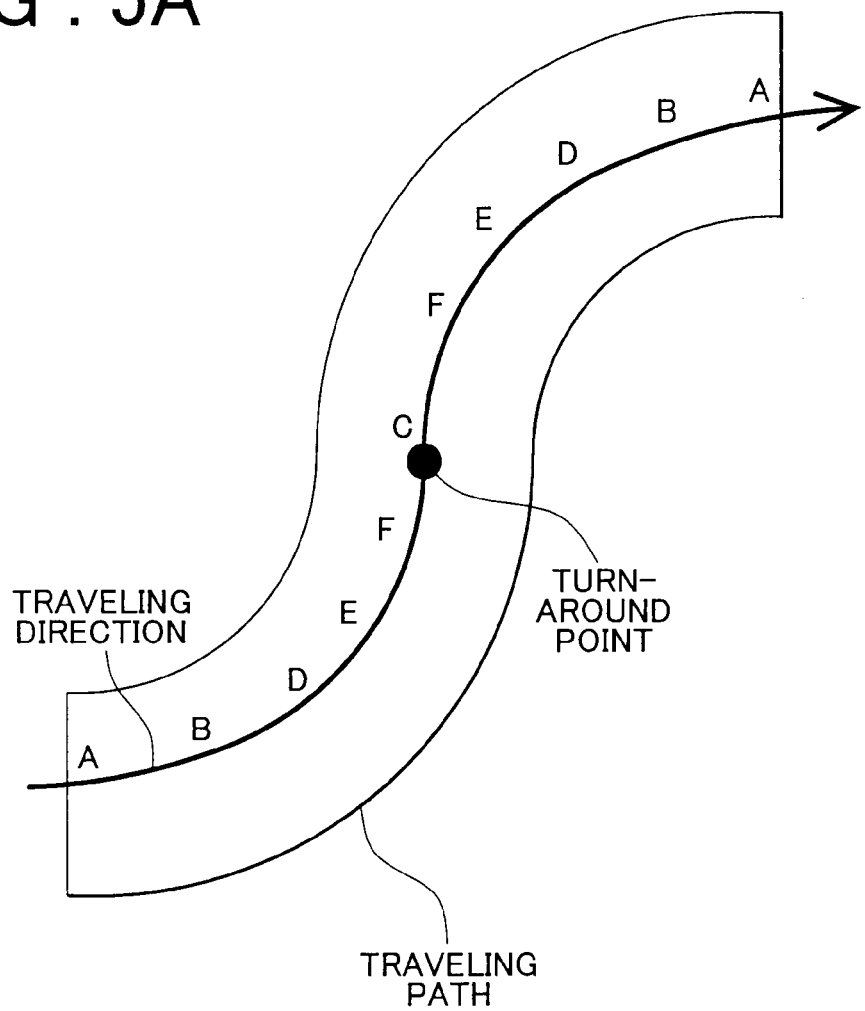
FIG. 5A is a diagram showing an example of the shape of an S-shaped road.

FIG. 5A is a diagram showing the correspondence between various points along the S-shaped road (curved path) through which the vehicle travels in a traveling direction shown in FIG. 5A and the ranges (A to F) of steering angle-average steering angular speed plane. As shown in FIG. 5A, the correspondence relation between the traveling points along the S-shaped road and the foregoing ranges changes as in A→B→E→D→E→F→C→E→D→E→B→A with the elapse of time. A reason for this will be explained below.

Figure 5B:
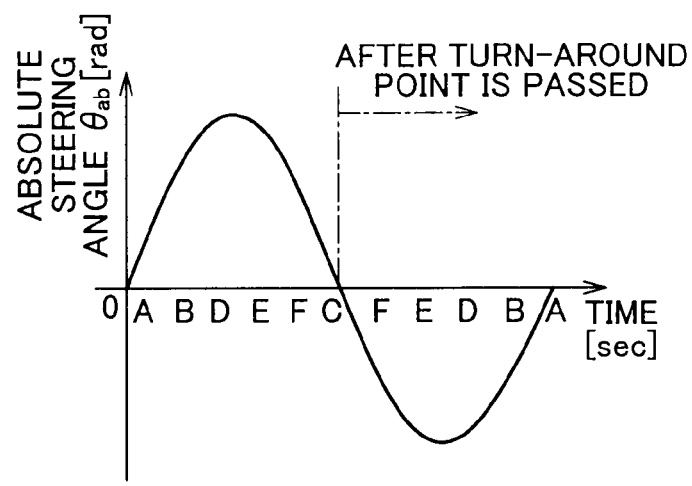
FIG. 5B is a diagram showing changes in the absolute steering angle at the time of traveling through an S-shaped road.
Figure 5C:
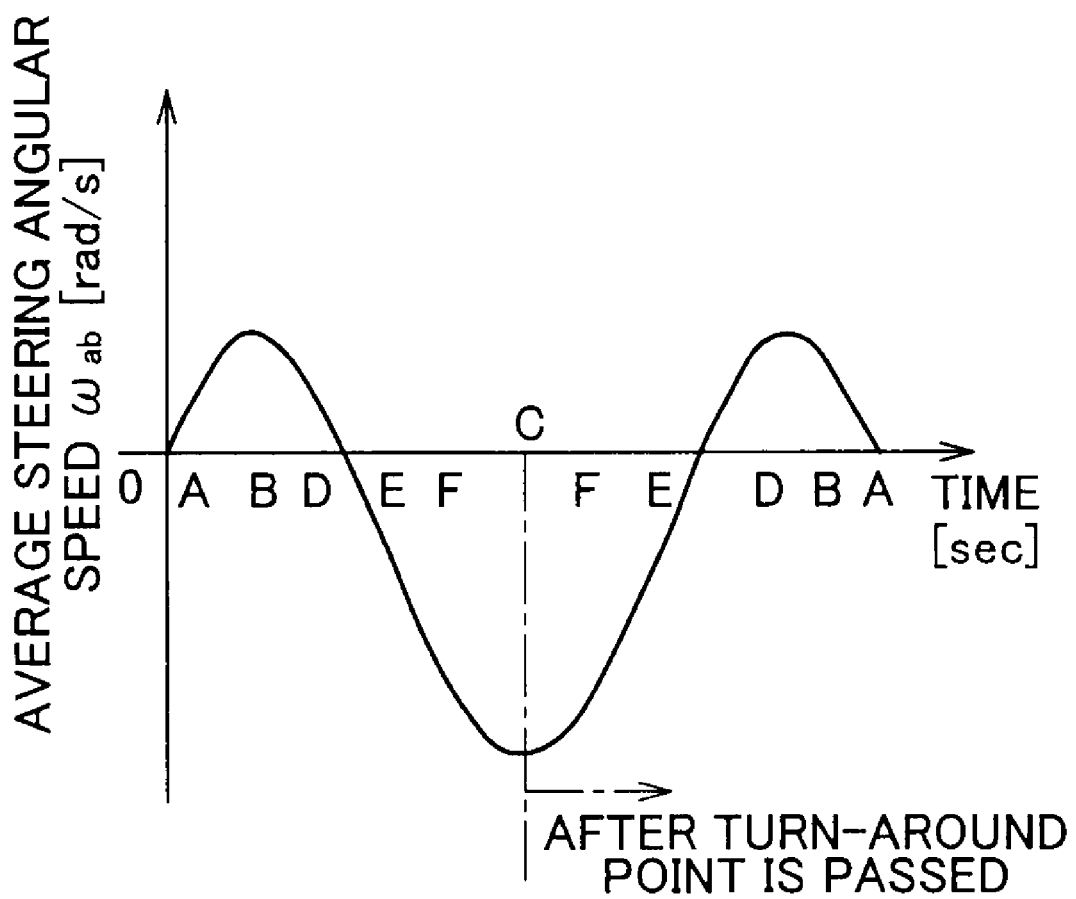
FIG. 5C is a diagram showing changes in the average steering angular speed at the time of traveling through an S-shaped road.

FIG. 5B is a diagram showing changes in the absolute steering angle with the elapse of time when a vehicle travels through the U-shaped road in the traveling direction shown in FIG. 4A. In FIG. 5B, the foregoing ranges (A to F) corresponding to the magnitude of the absolute steering angle are shown. As shown in FIG. 5B, the absolute steering angle of the vehicle traveling through the S-shaped road as shown in FIG. 5A begins to increase from zero with the elapse of time when the vehicle starts passing through the S-shaped road, and then changes in substantially the same fashion as a sine wave with its point of intersection with the axis of time being the time point at which the vehicle passes through the turn-around point shown in FIG. 5A. FIG. 5C is a diagram showing changes in the average steering angular speed with the elapse of time when the vehicle travels through the S-shaped road in the traveling direction shown in FIG. 5A. As shown in FIG. 5C, the average steering angular speed of the vehicle traveling through the S-shaped road shown in FIG. 5A exhibits changes in which the average steering angular speed reaches a peak near the entrance and the exit of the S-shaped road, and becomes the greatest value in negative when the vehicle passes through the turn-around point shown in FIG. 5A.

Figure 5D:
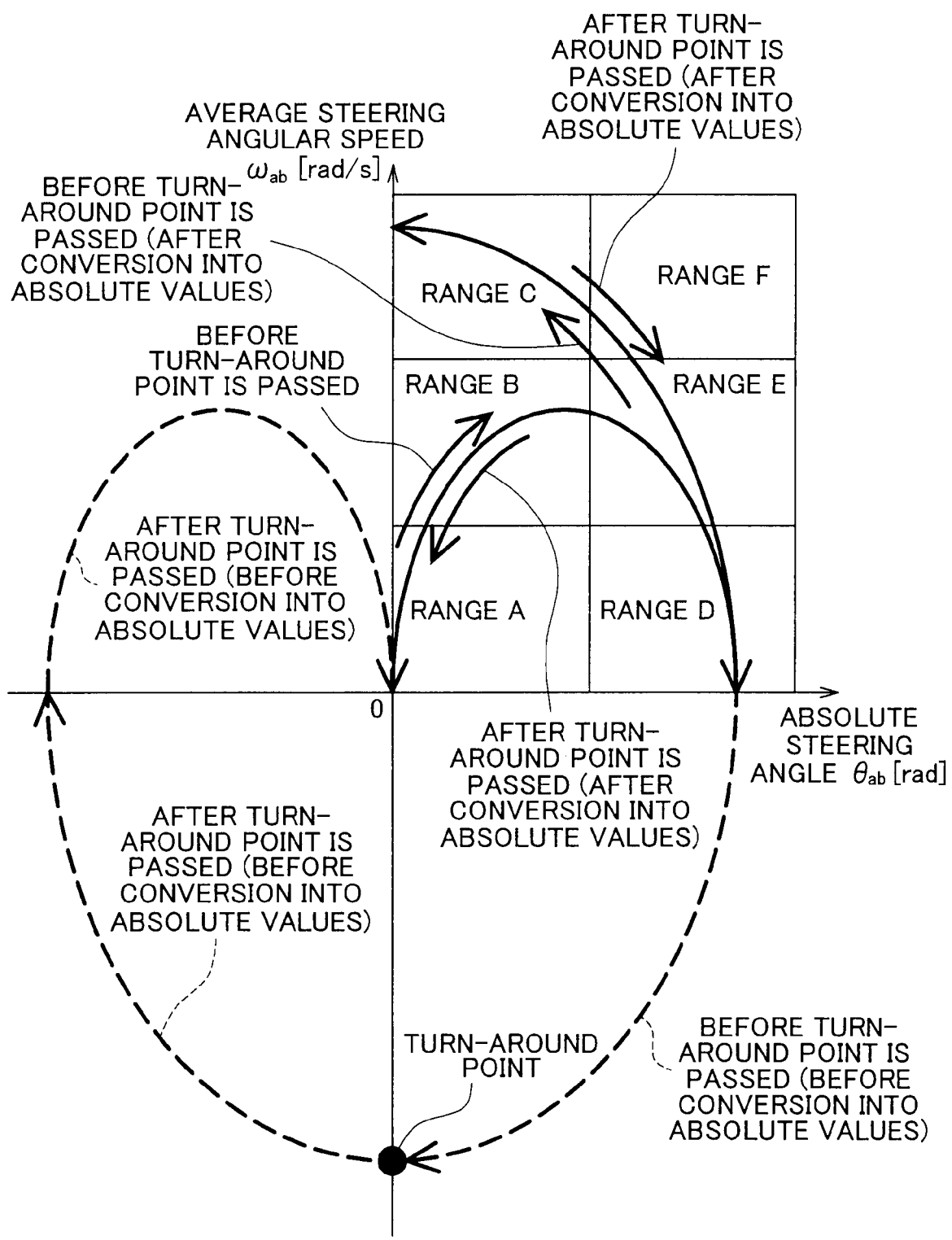
FIG. 5D is a diagram showing a steering angle-average steering angular speed plane at the time of traveling through an S-shaped road.

FIG. 5D is a diagram in which a locus of the vehicle traveling through the S-shaped road in the traveling direction as shown in FIG. 5A which is obtained from the absolute steering angle (FIG. 5B) and the average steering angular speed (FIG. 5C) that change with the travel of the vehicle is shown according to the elapse of time in the steering angle-average steering angular speed plane shown in FIG. 3. The locus determined by the absolute steering angle and the average steering angular speed of the vehicle traveling through the S-shaped road passes through the ranges A→B→E→D in that order from the start of the passage of the vehicle through the S-shaped road. After the average steering angular speed becomes zero in the range D, a locus shown by a broken line in FIG. 5D occurs. In this manner, when the vehicle travels through an S-shaped road, there are also times during which at least one of the absolute steering angle and the average steering angular speed becomes negative in value. Therefore, a process of converting the absolute steering angle and the average steering angular speed into absolute value is performed in this embodiment, as in the case where the vehicle travels through a U-shaped road. Hence, the locus of the vehicle traveling through the S-shaped road which is determined on a steering angle-average steering angular speed plane by the absolute steering angle and the average steering angular speed becomes as shown by a solid line in FIG. 5D. Therefore, when the vehicle travels through the S-shaped road shown in FIG. 5A, the correspondence relation between the traveling points and the foregoing ranges changes as in A→B→E→D→E→F→C→F→E→D→E→B→A with the elapse of time.

Next, the awake state estimation device in accordance with this embodiment associates the type of the traveling path through which the vehicle has traveled and the corrective steering angle in a correspondence relation with each other, in order to calculate correction values commensurate respectively with the types of traveling paths. More specifically, in the invention, the three variables, that is, the post-synchronization absolute steering angle, the post-synchronization average steering angular speed and the post-synchronization traveling speed, are each associated in a correspondence relation with the post-synchronization corrective steering angle, as described above. Therefore, if the absolute steering angle and the average steering angular speed each associated in a correspondence relation with a certain corrective steering angle by the foregoing synchronization process are specifically determined, a range shown in the scatter diagram of FIG. 3, that is, the type of the traveling path on which the vehicle is present, can be specifically determined, and therefore, the corrective steering angle and the type of the traveling path of the vehicle can be associated in a correspondence relation with each other. What has been described above is a method of making the type of the traveling path on which the vehicle is present and the corrective steering angle correspond to each other.

Next, an example of the method by which the awake state estimation device in accordance with the embodiment calculates a correction value corresponding to each type of traveling path will be described. As described above, the correction value in this embodiment is a standard deviation of the corrective steering angles that correspond to each of the types of traveling paths through which the vehicle has traveled with the driver being awake. Therefore, the awake state estimation device in accordance with this embodiment associates the post-synchronization corrective steering angle in a correspondence relation with the three variables, that is, the post-synchronization absolute steering angle, and the post-synchronization average steering angular speed, and stores them. Then, a standard deviation of each of the absolute steering angle, the average steering angular speed and the traveling speed that are contained in one of the ranges shown in FIG. 2 as well as the corrective steering angle associated in a correspondence relation with the absolute steering angle, the average steering angular speed and the traveling speed is calculated. The awake state estimation device in accordance with the embodiment performs the calculation of a standard deviation of the corrective steering angle with respect to all the ranges in each plane as shown in FIG. 2. As a result, the awake state estimation device in accordance with the embodiment is able to calculate a correction value that corresponds to each of the foregoing types of traveling paths. FIG. 6 is a diagram showing that the correction values calculated by the foregoing method correspond to the types of traveling paths. What has been described above is an example of the method of calculating a correction value that corresponds to each type of traveling path of the vehicle.

Next, a method in which the awake state estimation device in accordance with the embodiment, using the correction values calculated by the foregoing method, corrects the corrective steering angle used at the time of estimation of the awake state of the driver, and estimates the awake state on the basis of the post-correction corrective steering angle. When the awake state estimation device in accordance with the embodiment estimates the awake state of the driver, the awake state estimation device stores the corrective steering angle, and also stores three variables of the absolute steering angle, the average steering angular speed and the traveling speed that are each associated in a correspondence relation with the corrective steering angle by the synchronization process. Then, as in the case where a correction value is calculated by the foregoing method, a range that corresponds to the absolute steering angle, the average steering angular speed and the traveling speed associated in a correspondence relation with the stored corrective steering angle is specifically determined from the ranges shown in FIG. 6. After specifically determining a range shown in FIG. 6, the awake state estimation device in accordance with the embodiment performs a correction in which the stored corrective steering angle is divided by the correction value calculated corresponding to the specifically determined range, and thereby is standardized. Then, a moving standard deviation of the post-correction corrective steering angles in a period of time determined beforehand is calculated. If a result of the calculation is greater than or equal to a threshold value determined beforehand, it is estimated that the awake state of the driver has declined. The moving standard deviation is calculated by storing post-correction corrective steering angles in a certain period, and performing repeatedly with the elapse of time the calculation of a standard deviation of all the post-correction corrective steering angles stored for a past period of a pre-determined length of time (window length) immediately preceding the present time point which are extracted from the history of the stored post-correction corrective steering angles. Expression (1) is a mathematical expression that the awake state estimation device in accordance with the embodiment uses to calculate a moving standard deviation of post-correction (post-standardization) corrective steering angles.

Mathematical Expression 1

$W_{NE}$: window length [sec]
u(t): corrective steering angle [rad] (average of u(t)≈0)
$\sigma_a$ to $\sigma_z$: correction values
$SD_{NEW}$: moving standard deviation of post-correction corrective steering angles $$SD_{NEW} = std\left[\left\{\frac{u(t)}{\sigma_a} \quad \ldots \quad \frac{u(t-W_{NE})}{\sigma_z}\right\}\right] \quad (1)$$

Figure 7A:
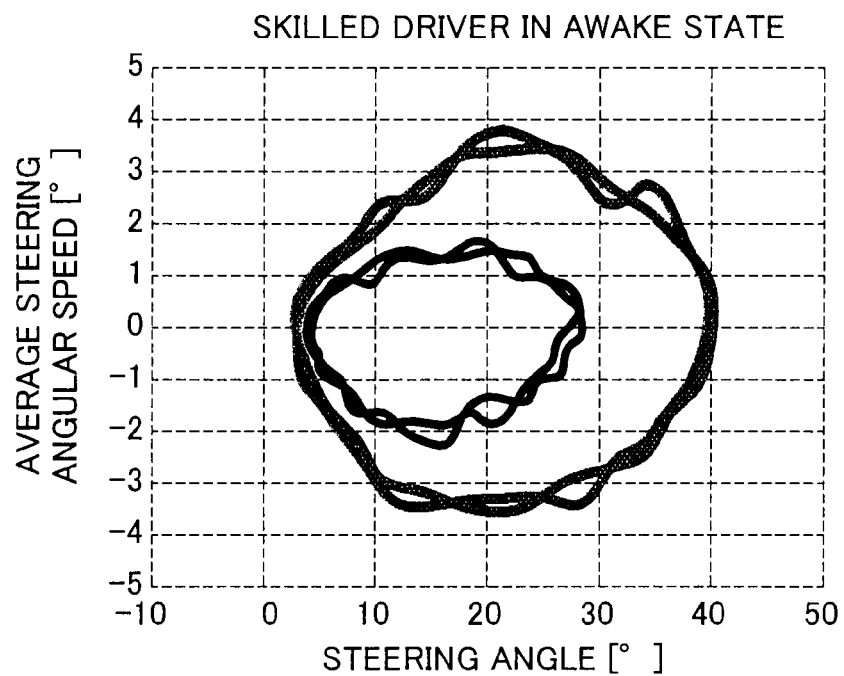
FIG. 7A is a diagram showing a tendency of fluctuations of the corrective steering angle occurring when a skilled driver is awake.
Figure 7B:
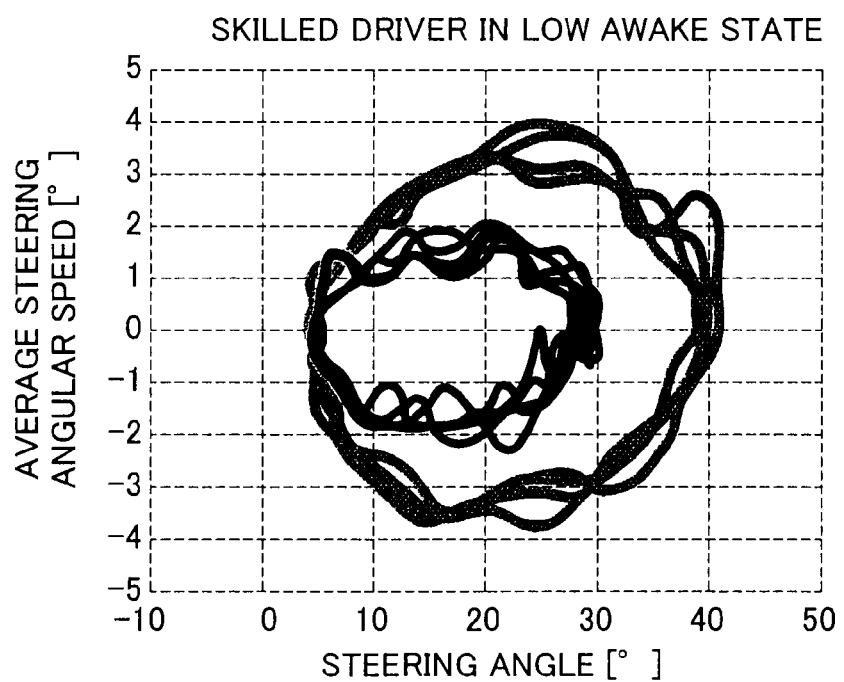
FIG. 7B is a diagram showing a tendency of fluctuations of the corrective steering angle occurring when a skilled driver is in a low awake state.
Figure 7C:
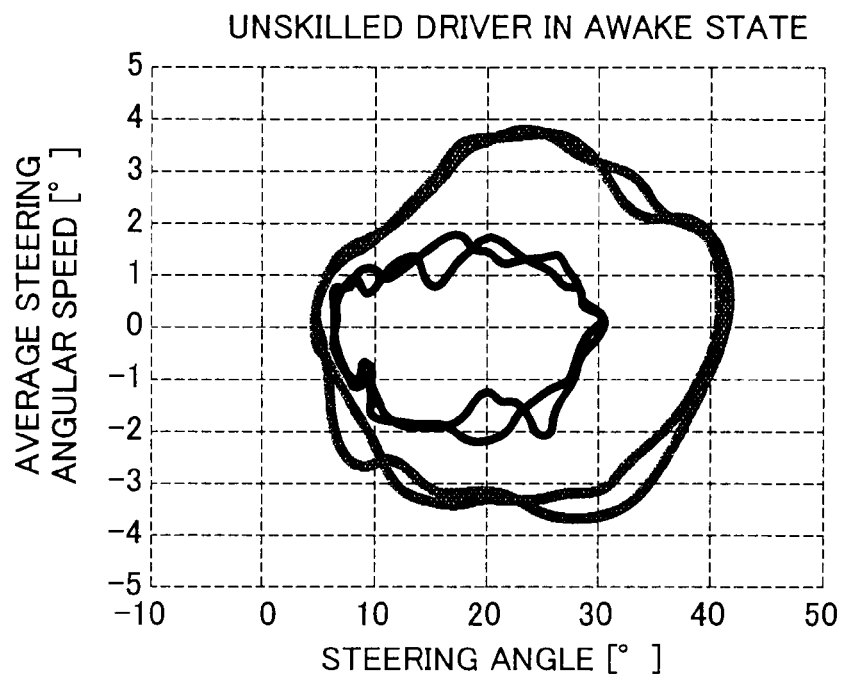
FIG. 7C is a diagram showing a tendency of fluctuations of the corrective steering angle occurring when an unskilled driver is awake.
Figure 7D:
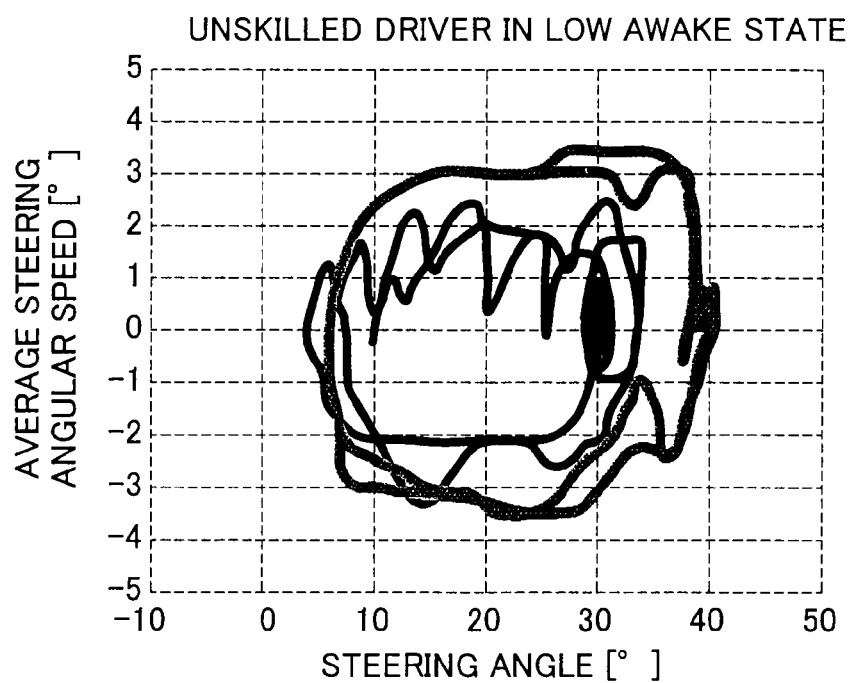
FIG. 7D is a diagram showing a tendency of fluctuations of the corrective steering angle occurring when an unskilled driver is in a low awake state.

The awake state estimation device in accordance with the embodiment is able to estimate the awake state with a sufficient accuracy by calculating a correction value according to each type of traveling path as described above. However, by taking into account that the tendency of fluctuations of the corrective steering angle also changes depending on drivers, the awake state can be estimated with even higher accuracy. FIGS. 7A to 7D show steering angle-average steering angular speed scatter diagrams for drivers with different driving skills when the drivers are awake and when the awake state of the drivers is low. FIGS. 7A and 7B show steering angle-average steering angular speed scatter diagrams for a driver with trained driving skill when the driver is awake and when the awake state of the driver is low. On the other hand, FIGS. 7C and 7D show steering angle-average steering angular speed scatter diagrams for a driver with untrained driving skill when the driver is awake and when the awake state of the driver is low. As is apparent from the comparison between FIGS. 7A to 7D, the tendency of fluctuations of the corrective steering angle changes also depending on the levels of the driving skill of the drivers. Therefore, the awake state estimation device in accordance with this embodiment may calculate and store the foregoing correction values separately for the individual drivers, and may estimate the awake state by using a correction value commensurate with the present driver. That is, the awake state estimation device in accordance with the embodiment may store correction value maps as shown in FIG. 6 separately for individual drivers, and may estimate the driver's awake state on the basis of a correction value map that is commensurate with the driver who is behind the wheel at the time of the awake state estimation process. What has been described above is an outline of the operation of the awake state estimation device in accordance with the embodiment.

Next, concrete construction and operation of the awake state estimation device in accordance with the embodiment will be described. FIG. 8 is a block diagram showing a general construction of an awake state estimation device 10 in accordance with the embodiment. The awake state estimation device 10 includes a steering angle detection portion 101, a vehicle speed detection portion 102, a traveling path detection portion 103, a turn-signal detection portion 104, an ignition signal detection portion 105, a driver indication portion 106, an awake state estimation portion 107, a storage portion 108, and a warning portion 109.

The steering angle detection portion 101 generates a rotation angle signal $T_S$ that shows the rotation angle of the steering handle that is changed by the driver operating the steering wheel. The vehicle speed detection portion 102 generates a vehicle speed signal $V_S$ that shows the traveling speed of the vehicle occurring at the time of detection. The traveling path detection portion 103 generates a traveling path signal $S_S$ that shows the type of the traveling path on which the vehicle is traveling, such as a local road, an express road, etc, and may be a device that is known as, for example, a car navigation system. The turn-signal detection portion 104 generates a turn indication signal $H_S$ that shows that the driver has operated a turn indicator. The ignition signal detection portion 105 generates an ignition signal $I_S$ that shows that the driver has turned on an ignition key or that the driver has turned off the ignition key. The driver indication portion 106 generates a driver indication signal $U_S$ that shows who the driver is, in response to the driver's operation of a switch (not shown). The awake state estimation portion 107 estimates the driver's awake state on the basis of the above-described awake state estimation method, and, according to a result of the estimation, generates a warning signal $K_S$ that commands the warning portion 109 to produce a warning. The storage portion 108 stores information that is needed for the operations of the awake state estimation portion 107 and the warning portion 109. The warning portion 109 produces a warning according to the warning signal $K_S$ generated by the awake state estimation portion 107.

Figure 9:
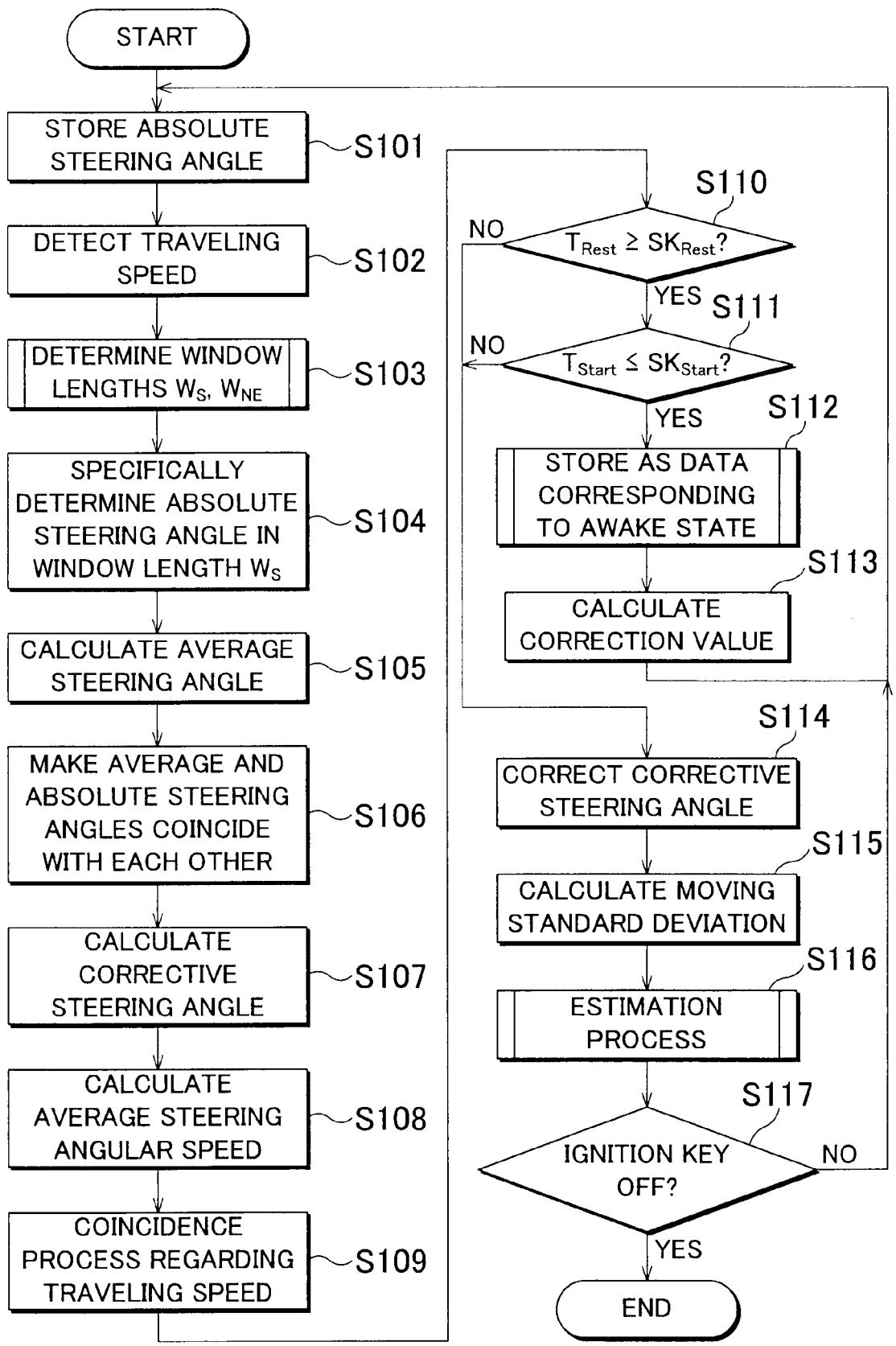
FIG. 9 is a flowchart showing a process that is performed by an awake state estimation portion in accordance with the first embodiment.

Next, a concrete process in which the awake state estimation portion 107 estimates the driver's awake state, and generates the warning signal $K_S$ according to a result of the estimation will be described with reference to a flowchart shown in FIG. 9.

In step S101, the awake state estimation portion 107 detects an absolute steering angle $\theta_Z$ needed to calculate an average steering angle in step S104 described below, on the basis of the rotation angle signal $T_S$ generated by the steering angle detection portion 101, and then stores the absolute steering angle $\theta_Z$ together with its detection time into the storage portion 108.

In step S102, the awake state estimation portion 107 detects the traveling speed of the vehicle occurring at the time of the process of step S102 on the basis of the vehicle speed signal Vs generated by the vehicle speed detection portion 102, and then stores the vehicle speed signal Vs together with its detection time into the storage portion 108.

In step S103, the awake state estimation portion 107 determines an optimal length of each of a window length $W_S$ used for the calculation of a moving average of the absolute steering angle $\theta_z$ (the foregoing average steering angle) and a window length $W_{NE}$ used for the calculation of a standard deviation of the post-correction (post-standardization) corrective steering, according to the traveling speed occurring at the time of process of step S103 or the type of the traveling location (a local road, an express road, etc.) at the time of process of step S103, and then stores the optimal window lengths $W_S$, $W_{NE}$ into the storage portion 108. A detailed description of the process of the awake state estimation portion 107 in step S103 will be given later.

Herein, a reason why the awake state estimation portion 107 performs the process of step S103 will be explained. FIG. 10A is a diagram showing an example of the absolute steering angle $\theta_Z$ that occurs when the vehicle travels along a road made up of relatively gently curved paths, such as an express road or the like. On the other hand, FIG. 10B is a diagram showing an example of the absolute steering angle $\theta_Z$ that occurs when the vehicle travels along a road made up of relatively sharply curved paths, such as a local road, a mountain road, etc. As is apparent from the comparison between FIG. 10A and FIG. 10B, the tendencies of fluctuations of the absolute steering angle $\theta_Z$ along the two types of curved paths are different. Therefore, without the appropriate setting of the window length used for the calculation of the average steering angle, an appropriate result of average cannot be obtained. Specifically, without the appropriate setting, a result will be that an unnecessarily smoothed average steering angle or a hardly smoothed average steering angle is calculated. If an appropriate average steering angle cannot be calculated, an accurate corrective steering angle cannot be calculated. Similarly, without the appropriate setting of the window length used for the calculation of a standard deviation of the post-standardization corrective steering angle, a suitable estimation accuracy of the awake state will not always be obtained.

In step S104, the awake state estimation portion 107 specifically determines all the absolute steering angles stored during a past period of the window length $W_S$ immediately preceding the present time point, from the absolute steering angles stored into the storage portion 108 in step S101, that is, from the history of the stored absolute steering angles. Incidentally, if the storage portion 108 does not store absolute steering angles corresponding to the entire period of the window length $W_S$ immediately preceding the time of process of step S104 for a reason, for example, that the elapsed time from the start of the process shown in the flowchart of FIG. 9 is short, or the like, then only the absolute steering angles stored in the storage portion 108 may also be specifically determined.

In step S105, the awake state estimation portion 107 calculates an average value of the absolute steering angles specifically determined in step S104, that is, the foregoing average steering angle, and then stores the average steering angle together with its calculation time into the storage portion 108. Since the awake state estimation portion 107 performs the process of steps S104 to S105, a moving average value of the absolute steering angles in the window length $W_S$ can be calculated.

In step S106, the awake state estimation portion 107 performs a coincidence process of making the calculation time of the average steering angle stored in the storage portion 108 and the detection time of the absolute steering angle stored in the storage portion 108 coincide with each other. More specifically, since the average steering angle is a moving average value of the absolute steering angles in the window length $W_S$, there occurs a time lag between the detection time of the absolute steering angle and the calculation time of the average steering angle. Concretely, the calculation time of the average steering angle is later than the detection time of the absolute steering angle by a half of the time of the window length (e.g., by $W_S/2$ if the window length is $W_S$). Then, if a difference between the average steering angle with a time delay and the absolute steering angle is found so as to calculate a corrective steering angle, an accurate corrective steering angle cannot be calculated. Therefore, in order to calculate an accurate corrective steering angle in step S107 described later, the awake state estimation portion 107 performs the process of making the detection time of the absolute steering angle $\theta_Z$ stored in step S101 and the calculation time of the average steering angle stored in S104 coincide with each other. Specifically, the awake state estimation portion 107 performs the process of making the calculation time of the average steering angle stored into the storage portion 108 in step S105 coincide with the detection time of the absolute steering angle stored in step S101 by moving the calculation time of the average steering angle backward by a half of the length of time of the window length ($W_S/2$ in this embodiment) for the calculation of the average steering angle.

In step S107, the awake state estimation portion 107 calculates a corrective steering angle by calculating a difference between the absolute steering angle and the average steering angle subjected to the coincidence process performed in step S106. Then, the awake state estimation portion 107 further performs a coincidence process of making the calculation time of the corrective steering angle coincide with the detection time of the absolute steering angle stored in step S101, and then stores the corrective steering angle into the storage portion 108.

In step S108, the awake state estimation portion 107 calculates an average steering angular speed by differentiating the average steering angle (post-coincidence-process average steering angle) stored in the storage portion 108. Then, the awake state estimation portion 107 further performs a coincidence process of making the calculation time of the average steering angular speed coincide with the detection time of the absolute steering angle stored in step S101, and then stores the average steering angular speed into the storage portion 108.

In step S109, the awake state estimation portion 107 further performs a coincidence process of making the detection time of the traveling speed detected in step S103 coincide with the detection time of the absolute steering angle stored in step S101, and then stores the traveling speed into the storage portion 108. That is, the process of the steps S106 to S109 performed by the awake state estimation portion 107 is a coincidence process in which the detection time of the traveling speed, the calculation time of the average steering angle, the calculation time of the average steering angular speed, and the calculation time of the corrective steering angle of the foregoing steps are made to coincide with the detection time of the absolute steering angle. In other words, the process of steps S106 to S109 can be said to be a process in which three variables, that is, the post-coincidence-process traveling speed, the post-coincidence-process absolute steering angle and the post-coincidence-process average steering angular speed, are each made to correspond to the post-coincidence-process corrective steering angle, and are combined into a single set with the post-coincidence-process corrective steering angle.

In step S110, the awake state estimation portion 107 calculates a resting time $T_{Rest}$ from the previous turning off of the ignition key to the following turning on of the ignition key on the basis of the time records stored in the storage portion 108, and determines whether or not the resting time $T_{Rest}$ is greater than or equal to a pre-determined resting time threshold value $SK_{Rest}$. If in step S110 it is determined that the resting time $T_{Rest}$ is greater than or equal to the resting time threshold value $SK_{Rest}$, the awake state estimation portion 107 proceeds to step S111. On the other hand, if in step S110 it is determined that the resting time $T_{Rest}$ is less than the resting time threshold value $SK_{Rest}$, the awake state estimation portion 107 proceeds to step S114. Incidentally, the aforementioned time of the previous turning off of the ignition key and the foregoing time of the turning on of the ignition key following the time of the turning off thereof are stored into the storage portion 108 by the awake state estimation portion 107 on the basis of a timer (clock) (not shown) every time the ignition signal $I_S$ is generated by the ignition signal detection portion 105. Besides, the resting time threshold value $SK_{Rest}$ is stored beforehand in the storage portion 108.

A reason why the awake state estimation portion 107 performs the process of step S110 will be explained. The time from the previous turning off of the ignition key to the following turning on of the ignition key which is calculated in step S110 by the awake state estimation portion 107 is considered to be a time during which the driver is resting. Then, when the resting time $T_{Rest}$ of the driver is greater than or equal to the resting time threshold value $SK_{Rest}$ determined beforehand, that is, when the driver finishes resting for a necessary amount time, it can be considered that the driver is in the awake state. Therefore, by performing the process of step S110, the awake state estimation portion 107 determines whether or not the time of processing step S108 is within a period during which the driver is awake. Then, the awake state estimation portion 107 determines whether the set of the post-coincidence-process traveling speed, the post-coincidence-process absolute steering angle, the post-coincidence-process corrective steering angle and the post-coincidence-process average steering angular speed obtained in steps S106 to S109 is to be stored as data for the period during which the driver is awake, that is, data for the calculation of the foregoing correction values, or is to be used as data for the estimation of the awake state of the driver.

In step S11, the awake state estimation portion 107 calculates a driving time $T_{Start}$ from the previous turning on of the ignition key to the performance of the process of step S111 on the basis of time records stored in the storage portion 108, and then determines whether or not the calculated driving time $T_{Start}$ is less than or equal to a pre-determined driving time threshold value $SK_{Start}$. If it is determined that the driving time $T_{Start}$ is less than or equal to the driving time threshold value $SK_{Start}$, the awake state estimation portion 107 proceeds to step S112. On the other hand, if in step S111 it is determined that the driving time $T_{Start}$ is greater than the driving time threshold value $SK_{Start}$, the awake state estimation portion 107 proceeds to step S114. Besides, the pre-determined driving time threshold value $SK_{Start}$ is pre-stored in the storage portion 108.

A reason why the awake state estimation portion 107 performs the process of step S111 will be explained. The driving time $T_{Start}$ from the previous turning on of the ignition key to the performance of the process of step S111 which the awake state estimation portion 107 calculates in step S111 is considered to be a length of time from when the driver starts driving and to when the process of step S111 is performed. Then, the time when the driving time $T_{Start}$ of the driver is less than or equal to the pre-determined driving time threshold value $SK_{Start}$ is considered to be the time when the driver is in the awake state since the fatigue accumulating in the driver following the start of the driving of the vehicle is small. Therefore, by performing the process of step S111, the awake state estimation portion 107 determines whether or not the time of performing the process of step S111 is in the period during which the driver is awake. Then, as described above in conjunction with the reason for performing the process of step S110, the awake state estimation portion 107 determines whether the set of the post-coincidence-process traveling speed, the post-coincidence-process absolute steering angle, the post-coincidence-process corrective steering angle and the post-coincidence-process average steering angular speed obtained in steps S106 to S109 is to be stored as data for the period during which the driver is awake, that is, data for the calculation of the foregoing correction values, or is to be used as data for the estimation of the awake state of the driver.

In step S112, the awake state estimation portion 107 stores only preferable data, of the set of the post-coincidence-process traveling speed, the post-coincidence-process absolute steering angle, the post-coincidence-process corrective steering angle and the post-coincidence-process average steering angular speed, into the storage portion 108 as data that corresponds to the time during which the driver is awake. Incidentally, detailed description of the process performed in the step S112 by the awake state estimation portion 107 will be given later.

In step S113, the awake state estimation portion 107 calculates a standard deviation of the corrective steering angle commensurate with each type of traveling path as a correction value by the foregoing method on the basis of the data stored as data for the time of the awake state in step S112, and stores the calculated standard deviations into the storage portion 108. Incidentally, an example of the correction value map that the awake state estimation portion 107 stores into the storage portion 108 in step S113 is the correction value map shown in FIG. 6. After completing the process of step S113, the awake state estimation portion 107 returns to step S101. That is, the process of step S112 and step S113 performed by the awake state estimation portion 107 is a process for collecting data at the time of the awake state of the driver during a period during which the driver is considered to be awake, and for calculating a correction value. On the other hand, the process of step S114 and later steps performed by the awake state estimation portion 107 is a process for estimating the driver's awake state by using a pre-calculated correction value. Hereinafter, the process of step S114 and later steps performed by the awake state estimation portion 107 will be described.

In step S114, the awake state estimation portion 107 corrects the corrective steering angle calculated in step S107, through the use of the correction value stored beforehand into the storage portion 108 in step S113. More concretely, the awake state estimation portion 107 specifically determines the type of the traveling path of the vehicle, that is, one of the ranges shown in FIG. 6, from the post-coincidence-process absolute steering angle, the post-coincidence-process average steering angular speed and the post-coincidence-process traveling speed obtained in steps S106 to S109, by the foregoing method. Then, the awake state estimation portion 107 performs a correction in which the corrective steering angle included in the same set as the absolute steering angle, the average steering angular speed and the traveling speed that were used to specifically determine the range, that is, the corrective steering angle corresponding to the set of the absolute steering angle, the average steering angular speed and the traveling speed, is divided and therefore standardized by a correction value that corresponds to the specifically determined range, and then stores the standardized corrective steering angle into the storage portion 108.

In step S115, the awake state estimation portion 107 reads from the storage portion 108 the post-correction corrective steering angles corresponding to the period of time of the window length $W_{NE}$ immediately preceding the time of process of step S115, and calculates a standard deviation of the corrective steering angles, and stores the standard deviation into the storage portion 108. That is, the process of step S115 is a process for calculating a moving standard deviation of the post-correction corrective steering angles that correspond to the window length $W_{NE}$. Incidentally, if the storage portion 108 does not store post-correction corrective steering angles corresponding to the entire period of the window length $W_S$ immediately preceding the time of process of step S115 for a reason, for example, that the elapsed time from the start of the process shown in the flowchart of FIG. 9 is short, or the like, a moving standard deviation of only the post-correction corrective steering angles stored in the storage portion 108 may also be calculated.

In step S116, the awake state estimation portion 107 estimates the awake state of the driver on the basis of the moving standard deviation of the post-correction corrective steering angle calculated in step S115, and generates the foregoing warning signal $K_S$ on the basis of the result of the estimation. Incidentally, detailed description of the process of step S116 performed by the awake state estimation portion 107 will be given later.

In step S117, the awake state estimation portion 107 determines whether or not the ignition key is in the off-state, on the basis of the ignition signal $I_S$ generated by the ignition signal detection portion 105. If in step S117 it is determined that the ignition key is in the off-state, the awake state estimation portion 107 ends the process shown by the flowchart of FIG. 9. On the other hand, if in step S117 it is determined that the ignition key is not in the off-state, the awake state estimation portion 107 returns to step S101. What has been described above is a main process performed by the awake state estimation portion 107 in accordance with the embodiment.

Next, the process of steps S103, S112 and S116 performed by the awake state estimation portion 107 will be described further in detail. First, the process of step S103 performed by the awake state estimation portion 107 will be described in detail.

Figure 11A:
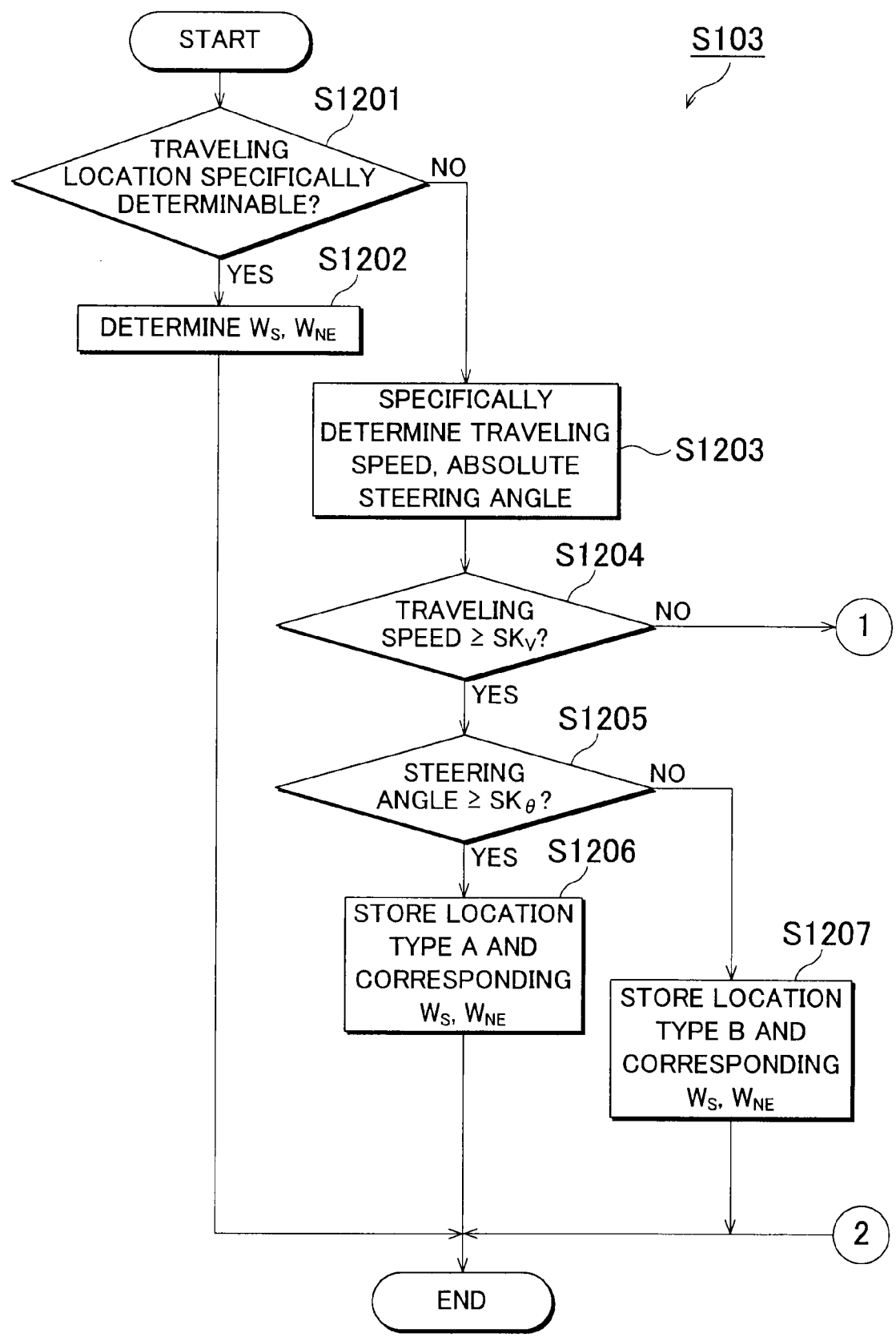
FIG. 11 is a flowchart showing a process performed by an awake state estimation portion in accordance with the first embodiment.
Figure 11B:
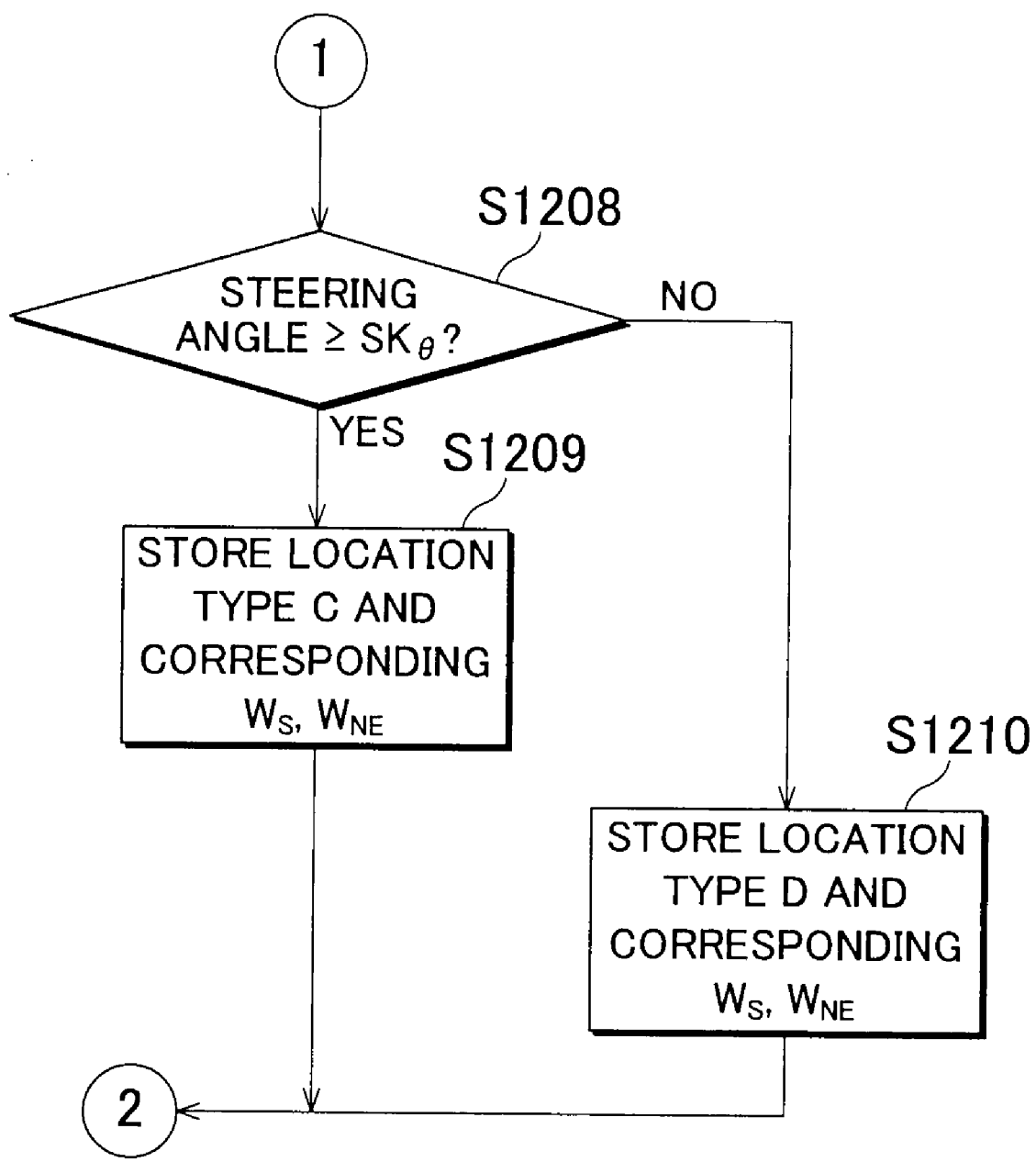

A reason or purpose for which the awake state estimation portion 107 performs the process of step S103 is to determine the lengths of the window lengths $W_S$ and $W_{NE}$ according to at least one of the traveling speed, the absolute steering angle and the type of traveling location. In this embodiment, there are two kinds of methods by which the awake state estimation portion 107 determines the lengths of the window lengths $W_S$ and $W_{NE}$. The two kinds of methods are a method in which the lengths of the window lengths $W_S$ and $W_{NE}$ are determined according to the traveling speed and the absolute steering angle, and a method in which a type of the traveling location (a local road, an express road, etc.) is estimated on the basis of the traveling speed and the absolute steering angle, and the window lengths $W_S$ and $W_{NE}$ of pre-determined lengths according to the estimated type of traveling location are selected. First, the method in which the type of the traveling location is estimated and window lengths $W_S$ and $W_{NE}$ are selected according to the estimated type of traveling location will be described. FIGS. 11A and 11B are flowcharts showing a process in step S103 in which the awake state estimation portion 107 estimates a type of the traveling location, and selects window lengths $W_S$ and $W_{NE}$ according to the result of the estimation.

In step S1201, the awake state estimation portion 107 determines whether or not the traveling location type at the time of process of step S1201 can be specifically determined by the traveling path detection portion 103. If in step S1201 it is determined that the traveling path detection portion 103 can specifically determine the traveling location type, the awake state estimation portion 107 proceeds to step S1202. On the other hand, if in step S1201 it is determined that the traveling path detection portion 103 cannot specifically determine the traveling location type, the awake state estimation portion 107 proceeds to step S1203.

In step S1202, the awake state estimation portion 107 determines the traveling location type according to the traveling path signal $S_S$ generated by the traveling path detection portion 103, and selects, according to the determined traveling location type, window lengths $W_S$ and $W_{NE}$ that are determined beforehand according to the traveling location types, and stores the traveling location type and the window lengths $W_S$ and $W_{NE}$ corresponding to the traveling location type into the storage portion 108. After completing the process of step S1202, the awake state estimation portion 107 ends the process shown in the flowchart of FIGS. 11A and 11B, and starts the process of step S104 in the flowchart shown in FIG. 9.

In step S1203, the awake state estimation portion 107 specifically determines the traveling speed and the absolute steering angle occurring at the time of performing the process of step S1203 on the basis of the rotation angle signal $T_S$ generated by the steering angle detection portion 101 and the vehicle speed signal $V_S$ generated by the vehicle speed detection portion 102.

In step S1204, the awake state estimation portion 107 determines whether or not the traveling speed specifically determined in step S1203 is greater than or equal to a pre-determined vehicle speed threshold value $SK_V$. If in step S1204 it is determined that the traveling speed is greater than or equal to the vehicle speed threshold value $SK_V$, the awake state estimation portion 107 proceeds to step S1205. On the other hand, if in step S1204 it is determined that the traveling speed is less than the vehicle speed threshold value $SK_V$, the awake state estimation portion 107 proceeds to step S1208.

In step S1205, the awake state estimation portion 107 determines whether or not the absolute steering angle specifically determined in step S1203 is greater than or equal to a pre-determined angle threshold value $SK\theta$. If in step S1205 it is determined that the absolute steering angle is greater than or equal to the angle threshold value $SK\theta$, the awake state estimation portion 107 proceeds to step S1206. On the other hand, if in step S1205 it is determined that the absolute steering angle is less than the angle threshold value $SK\theta$, the awake state estimation portion 107 proceeds to step S1207.

In step S1206, the awake state estimation portion 107 estimates that the traveling location where the vehicle was traveling at the time of process of step S1203 was a location type A (an express road having many curved paths with relatively sharp curves), since the process of step S1204 to step S1205 has found that the traveling speed is greater than or equal to the vehicle speed threshold value $SK_V$ and that the absolute steering angle is greater than or equal to the angle threshold value $SK\theta$. The awake state estimation portion 107 selects the window lengths $W_S$ and $W_{NE}$ determined beforehand according to the location type A, as the lengths of the window length to be used in the awake state estimation process, and then stores the estimated location type and the selected window lengths $W_S$ and $W_{NE}$ into the storage portion 108. After completing the process of step S1206, the awake state estimation portion 107 ends the process shown in the flowchart of FIGS. 11A and 11B, and starts the process of step S104 in the flowchart of FIG. 9.

In step S1207, the awake state estimation portion 107 estimates that the traveling location where the vehicle was traveling at the time of process of step S1203 was a location type B (an express road having many curved paths with relatively gentle curves), since the process of step S1204 to step S1205 has found that the traveling speed is greater than or equal to the vehicle speed threshold value $SK_V$ and that the absolute steering angle is less than the angle threshold value $SK\theta$. The awake state estimation portion 107 selects the window lengths $W_S$ and $W_{NE}$ determined beforehand according to the location type B, as the lengths of the window lengths to be used in the awake state estimation process, and then stores the estimated location type and the selected window lengths $W_S$ and $W_{NE}$ into the storage portion 108. After completing the process of step S1207, the awake state estimation portion 107 ends the process shown in the flowchart of FIGS. 11A and 11B, and starts the process of step S104 shown in the flowchart of FIG. 9.

In step S1208, the awake state estimation portion 107 determines whether or not the absolute steering angle specifically determined in step S1203 is greater than or equal to the pre-determined angle threshold value $SK\theta$. If in step S1208 it is determined that the absolute steering angle is greater than or equal to angle threshold value $SK\theta$, the awake state estimation portion 107 proceeds to step S1209. On the other hand, if in step S1208 it is determined that the absolute steering angle is less than the angle threshold value $SK\theta$, the awake state estimation portion 107 proceeds to step S1210. Incidentally, the angle threshold value $SK\theta$ used in the step S1205 and the tangle threshold value $SK\theta$ used in step S1208 may be the same value or may also be different from each other.

In step S1209, the awake state estimation portion 107 estimates that the traveling location where the vehicle was traveling at the time of process of step S1203 was a location type C (a local road having many curved paths with relatively sharp curves), since the process of step S1204 and step S1208 has found that the traveling speed is less than the vehicle speed threshold value $SK_V$ and that the absolute steering angle is greater than or equal to the angle threshold value $SK\theta$. The awake state estimation portion 107 selects the window lengths $W_S$ and $W_{NE}$ determined beforehand according to the location type C, as the lengths of the window lengths to be used in the awake state estimation process, and then stores the estimated location type and the selected window lengths $W_S$ and $W_{NE}$ into the storage portion 108. After completing the process of step S1209, the awake state estimation portion 107 ends the process shown in the flowchart of FIGS. 11A and 11B, and starts the process of step S104 shown in the flowchart of FIG. 9.

In step S1210, the awake state estimation portion 107 estimates that the traveling location where the vehicle was traveling at the time of process of step S1203 was a location type D (a local road having many curved paths with relatively gentle curves), since the process of step S1204 and step S1208 has found that the traveling speed is less than the vehicle speed threshold value $SK_V$ and that the absolute steering angle is less than the angle threshold value $SK\theta$. The awake state estimation portion 107 selects the window lengths $W_S$ and $W_{NE}$ determined beforehand according to the location type D, as the lengths of the window lengths to be used in the awake state estimation process, and then stores the estimated location type and the selected window lengths $W_S$ and $W_{NE}$ into the storage portion 108. After completing the process of step S1210, the awake state estimation portion 107 ends the process shown in the flowchart of FIGS. 11A and 11B, and starts the process of step S104 shown in the flowchart of FIG. 9. What has been described above is the method by which in step S103 the awake state estimation portion 107 estimates the traveling location type, and selects window lengths $W_S$ and $W_{NE}$ according to the estimated traveling location type. Incidentally, the awake state estimation device in accordance with the embodiment may also select optimal window lengths $W_S$ and $W_{NE}$ on the basis of the average steering angular speed.

Next, the other kind of method by which in step S103 the awake state estimation portion 107 determines the lengths of the window lengths $W_S$ and $W_{NE}$, that is, the method by which the awake state estimation portion 107 determines the lengths of the window lengths $W_S$ and $W_{NE}$ according to the traveling speed and the absolute steering angle, will be described. FIG. 12 is a diagram showing a flowchart of a process in step S103 in which the awake state estimation portion 107 determines the lengths of the window lengths $W_S$ and $W_{NE}$ according to the traveling speed and the absolute steering angle.

In step S1211, the awake state estimation portion 107 specifically determines the traveling speed and the absolute steering angle occurring at the time of process of step S1211 on the basis of the rotation angle signal $T_S$ generated by the steering angle detection portion 101 and the vehicle speed signal $V_S$ generated by the vehicle speed detection portion 102.

In step S1212, the awake state estimation portion 107 determines the window lengths $W_S$ and $W_{NE}$ by a pre-determined determination method, according to the traveling speed specifically determined in step S1211. Incidentally, a concrete method by which in step S1212 the awake state estimation portion 107 determines the window lengths $W_S$ and $W_{NE}$ may be a method in which the window lengths $W_S$ and $W_{NE}$ are set longer the higher the traveling speed, or the window lengths $W_S$ and $W_{NE}$ are set shorter the higher the absolute steering angle. Furthermore, a concrete method by which the awake state estimation portion 107 determines the window lengths $W_S$ and $W_{NE}$ may also be a method in which the window lengths $W_S$ and $W_{NE}$ are set shorter the larger the width of fluctuation of the steering angle, or the window lengths $W_S$ and $W_{NE}$ are set longer the smaller the width of fluctuation of the steering angle. After completing the process of the step S1212, the awake state estimation portion 107 ends the process shown in the flowchart of FIG. 12, and starts the process of step S104 shown in FIG. 9.

Next, a process performed in step S112 by the awake state estimation portion 107 will be described further in detail. The awake state estimation portion 107 in step S107 needs to make the corrective steering angles stored in the storage portion 108 correspond to the ranges in the correction value map determined separately for each driver. FIG. 13 is a flowchart showing in detail the process performed in step S112 by the awake state estimation portion 107.

In step S1121, the awake state estimation portion 107 specifically determines who the driver is. To this end, when a driver indication signal $U_S$ is generated in response to the driver's operation of a switch (not shown) of the driver indication portion 106, the awake state estimation portion 107 may store the driver shown by the driver indication signal $U_S$ into the storage portion 108. Therefore, in step S1121, the awake state estimation portion 107 can specifically determine the present driver with reference to the drivers stored in the storage portion 108.

In step S1122, the awake state estimation portion 107 determines whether or not the turn indicator is operated by the driver at the time of process of step S1122 on the basis of the turn indication signal $H_S$ generated by the turn-signal detection portion 104. If in step S1122 it is determined that the turn indicator is not operated by the driver, the awake state estimation portion 107 proceeds to step S1123. On the other hand, if in step S1122 it is determined that the turn indicator is operated by the driver, the awake state estimation portion 107 ends the process shown in the flowchart of FIG. 13, and proceeds to step S101 in FIG. 9.

Herein, a reason why the awake state estimation portion 107 performs the process of step S1122 will be explained. The time when the turn indicator is operated by the driver is considered to be the time when the driver intentionally turns the steering handle to a great extent and thereby changes the traveling direction of the vehicle. Then, the data obtained when the driver intentionally turns the steering handle to a great extent is not appropriate as data for the awake state estimation process. Therefore, by performing the process of step S1122, the awake state estimation portion 107 determines that the set of data of the post-coincidence-process traveling speed, the post-coincidence-process absolute steering angle, the post-coincidence-process corrective steering angle, and the post-coincidence-process average steering angular speed obtained in steps S106 to S109 is not appropriate. Then, the awake state estimation portion 107 does not use this inappropriate data to calculate a correction value, and simply returns to step S101.

In step S1123, the awake state estimation portion 107 sets the data combined into a single set by performing the process of steps S106 to S109 as data corresponding to the awake state that corresponds to the driver specifically determined in step S106 to step S109. After completing the process of the step S1123, the awake state estimation portion 107 ends the process shown in the flowchart of FIG. 13, and starts the process of step S113 in FIG. 9.

Figure 14:
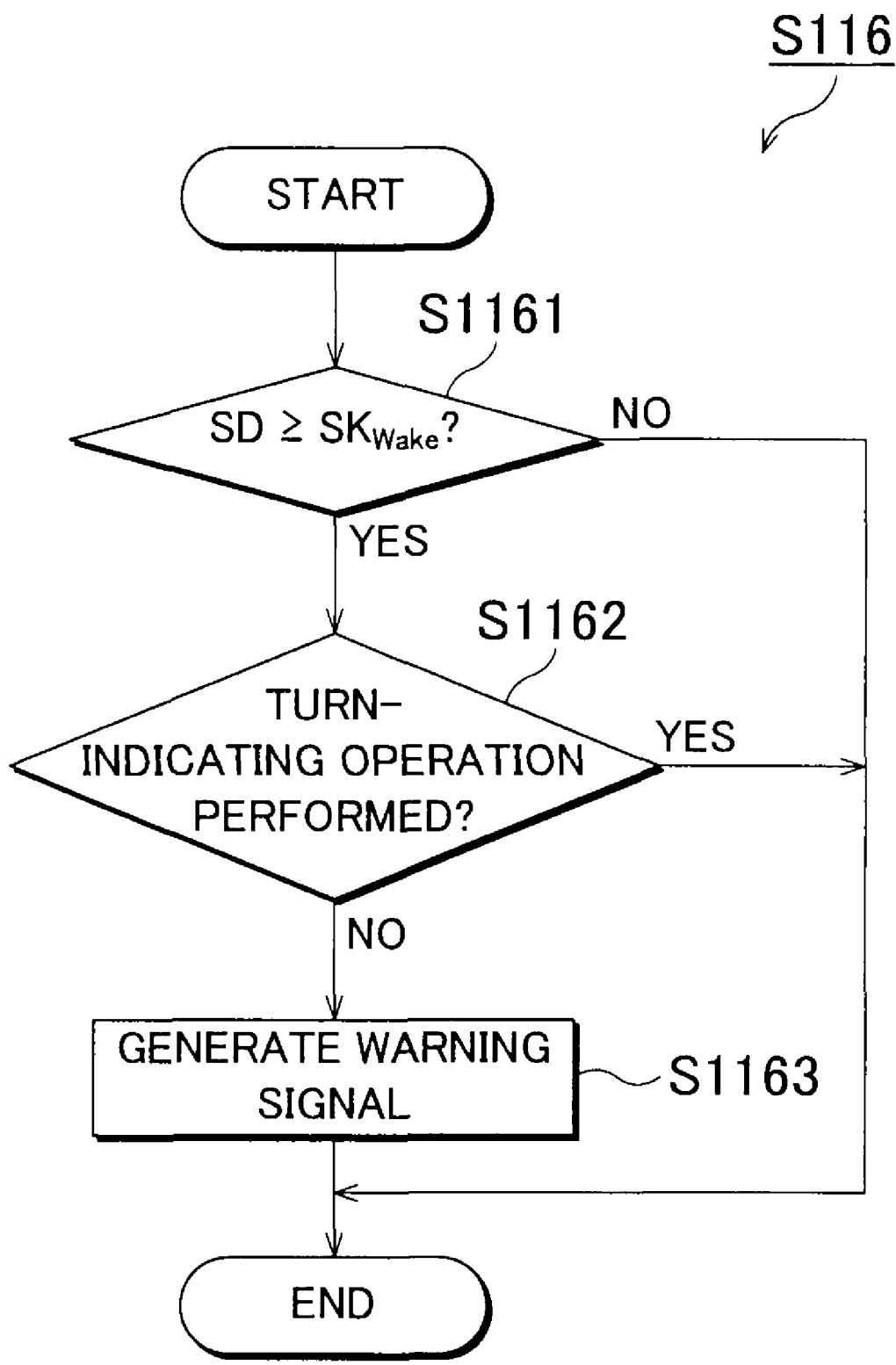
FIG. 14 is a flowchart showing a process performed by the awake state estimation portion in accordance with the first embodiment.

Next, a process performed in step S116 by the awake state estimation portion 107 will be described further in detail. FIG. 14 is a flowchart showing the process performed in step S116 by the awake state estimation portion 107.

In step S1161, the awake state estimation portion 107 determines whether or not the moving standard deviation SD of the post-correction corrective steering angle calculated in step S115 is greater than or equal to an awake state threshold value $SK_{Wake}$ determined beforehand. If in step S1161 it is determined that the moving standard deviation SD of the post-correction corrective steering angle is greater than or equal to the awake state threshold value $SK_{Wake}$, the awake state estimation portion 107 proceeds to step S1162. On the other hand, if in step S1161 it is determined that the moving standard deviation SD of the post-correction corrective steering angle is less than the awake state threshold value $SK_{Wake}$, the awake state estimation portion 107 ends the process shown in the flowchart of FIG. 14, and proceeds to step S117 shown in FIG. 9.

In step S1162, the awake state estimation portion 107 determines whether or not the turn indicator is operated by the driver at the time of process of step S1162 on the basis of the turn indication signal $H_S$ generated by the turn-signal detection portion 104. If in step S1162 it is determined that the turn indicator is operated by the driver, the awake state estimation portion 107 ends the process shown in the flowchart of FIG. 14, and proceeds to step S117 shown in FIG. 9. On the other hand, if in step S1162 it is determined that the turn indicator is not operated by the driver, the awake state estimation portion 107 proceeds to step S1163.

In step S1163, the awake state estimation portion 107 generates the warning signal $K_S$ that commands the warning portion 109 to produce a warning. After completing the process of step S1163, the awake state estimation portion 107 ends the process shown in the flowchart of FIG. 14, and proceeds to step S117 shown in FIG. 9.

What has been described above is the process performed by the awake state estimation portion 107 in accordance with the embodiment. The awake state estimation portion 107 in accordance with the embodiment estimates the degree of awake state of the driver as described above, and generates the warning signal Ks if it is determined that the degree of the awake state of the driver is low. Then, upon acquiring the warning signal Ks generated by the awake state estimation portion 107, the warning portion 109 produces a warning to the driver.

Incidentally, the kind of the warning produced by the warning portion 109 may be any warning as long as the warning has such a stimulus as to bring the driver from the low awake state to the awake state. As a concrete example of the kind of the warning that the warning portion 109 produces may be a voice warning. Furthermore, when the warning portion 109 produces a voice warning, the start of the warning can be made easy to be perceived by intermittently sounding beeps immediately prior to the warning. Besides, the phrase of the voice warning may be made up of words easy to understand, and may also be a short phrase. A reason why the warning that the warning portion 109 produces may be a voice warning is that lately an increasing number of kinds of warning sounds are being produced from vehicles, including a warning for preventing the driver from looking aside while driving, a waning produced when the speed limit is exceeded, etc. Besides, it is also conceivable that when a warning sound is produced from the vehicle, the display for a car navigation system or the like is caused to display which kind of waning has been produced. However, the manner of warning will draw the driver's attention to the display screen, and will reduce the attention regarding the traveling direction of the vehicle. Therefore, it is preferable that the kind of the warning to the driver be a voice warning. However, it should be apparent that any kind of warning suffices as long as the warning does not reduce the driver's attention that is needed in order to drive the vehicle.

What has been described above is the awake state estimation device 10 in accordance with the first embodiment. According to the awake state estimation device 10 in accordance with the embodiment, the correction in which the corrective steering angle is standardized is performed, and the moving standard deviation of post-correction corrective steering angles is calculated. Therefore, even when the vehicle travels along any one of the foregoing various types of traveling paths, high-accuracy estimation of the degree of the awake state can be achieved if only one threshold value (e.g., the foregoing awake state threshold value $SK_{Wake}$) for comparison with the moving standard deviation value of post-correction corrective steering angles is determined beforehand.

Incidentally, the foregoing awake state threshold value $SK_{Wake}$ may also be determined beforehand on the basis of the corrective steering angle occurring at the time of driving along one of the foregoing various types of traveling paths (e.g., a straight path), during a period during which the driver is awake.

Modifications of First Embodiment

Figure 15:
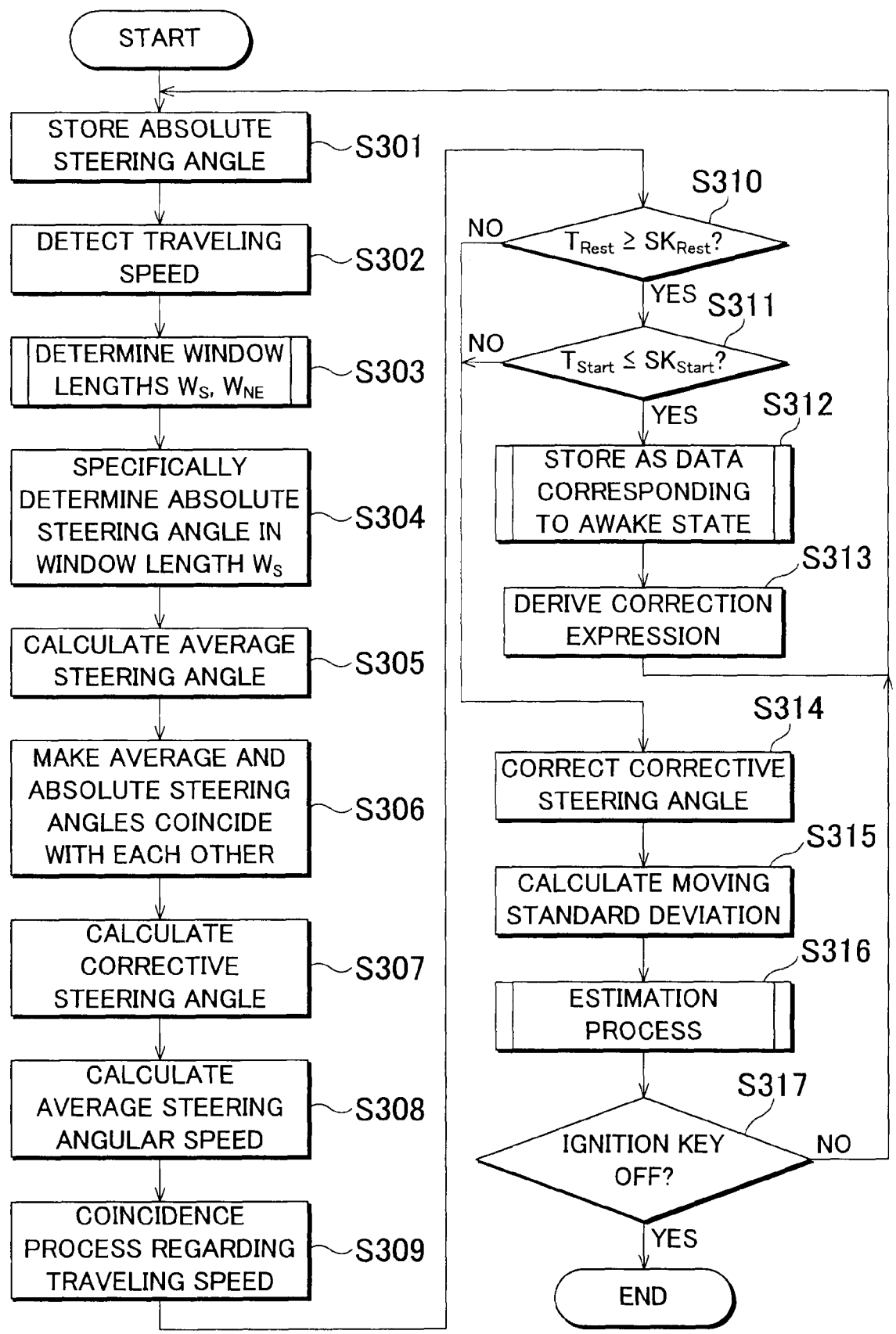
FIG. 15 is a flowchart showing a process performed by the awake state estimation portion in accordance with a modification of the first embodiment.

The awake state estimation device 10 in accordance with the first embodiment corrects the corrective steering angle occurring at the time of the awake state estimation process, by the standard deviation of the corrective steering angle occurring during the awake state. However, the awake state estimation device 10 may also derive a mathematical expression for predicting a corrective steering angle that can be a norm thereof occurring when the driver is awake, through the use of a technique of a multiple regression analysis, and may also correct the corrective steering angle occurring at the time of the estimation process on the basis of the derived mathematical expression. Hereinafter, a process of an awake state estimation portion 107 in accordance with a modification of the first embodiment will be described with reference to the flowchart of FIG. 15. In the process shown in the flowchart of FIG. 15, the processes of steps S301 to S312, and the process of steps S315 to S317 are substantially the same as the process of steps S101 to S112 and steps S115 to S117 shown in the flowchart of FIG. 9, which has been referred to above in conjunction with the description of the first embodiment. Therefore, with regard to the process performed by the awake state estimation portion 107 in accordance with the modification of the first embodiment, the description of the processes substantially the same as those in the first embodiment is omitted, and only the process of steps S313 and S314 will be described.

Figure 16:
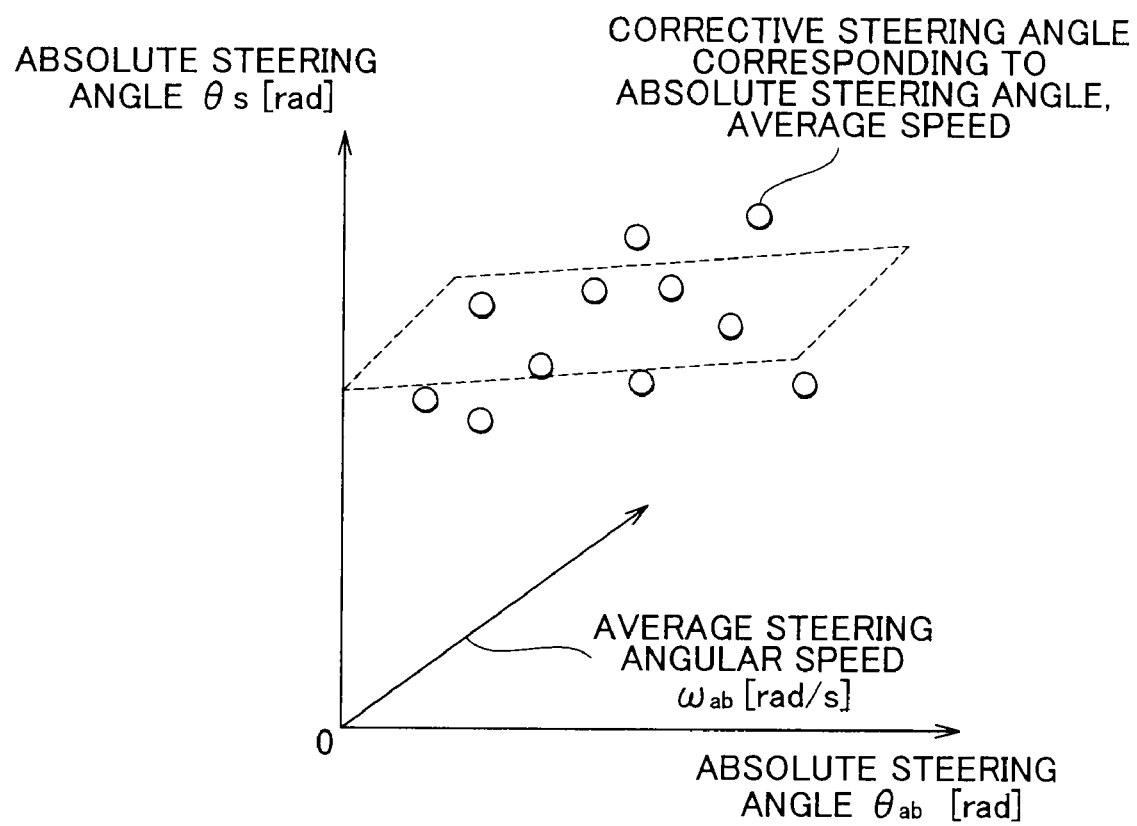
FIG. 16 is a diagram illustrating an approximation plane in a modification of the first embodiment.

In step S313, the awake state estimation portion 107 drives a correction mathematical expression (prediction expression) that becomes a norm of the tendency of fluctuations of the corrective steering angle during the awake state of the driver on the basis of the data that is stored in step S312 as the data occurring during the awake state. This mathematical expression contains the absolute steering angle $\theta_Z$ and the average steering angular speed $\omega_H$ as parameters. More concretely, the awake state estimation portion 107 reads only a necessary set of the absolute steering angle $\theta_Z$, the average steering angular speed $\omega_H$ and the corrective steering angle $\theta_S$, among the data stored in step S312 as the data for the awake state. The process performed in step S313 by the awake state estimation portion 107 will be described with reference to FIG. 16 in order to facilitate the understanding of the description. FIG. 16 is a diagram in which the corrective steering angle $\theta_S$ is plotted by the awake state estimation portion 107 reading a necessary set of data in step S313 and using the absolute steering angle $\theta_Z$ and the average steering angular speed $\omega_H$ as parameters. After reading a necessary set of data in step S313, the awake state estimation portion 107 derives a prediction expression that represents a three-dimensional plane as shown in FIG. 16, on the basis of the read data, and stores the prediction expression in the storage portion 108. The three-dimensional plane shown in FIG. 16 is a plane (approximate plane) that best represents the tendency of fluctuations of the corrective steering angles $\theta_S$ read in step S313 by the awake state estimation portion 107, that is, the tendency of fluctuations of the corrective steering angle occurring during the awake state of the driver, and is also a plane for predicting the tendency of fluctuations of the corrective steering occurring during the awake state of the driver. Furthermore, since the three-dimensional plane shown in FIG. 16 is a plane based on the absolute steering angle and the average steering angular speed, the use of this plane makes it possible to specifically determine the type of the traveling path of the vehicle, as in the foregoing method that uses the traveling speed-steering angle-average steering angular speed scatter diagram shown in FIG. 6. In step S313, the awake state estimation portion 107 derives a three-dimensional plane as shown in FIG. 16, that is, the prediction expression, by using a technique such as a multiple regression analysis and the like. Incidentally, what the awake state estimation portion 107 drives in step S313 does not need to be a prediction expression that represents a three-dimensional plane, but may also be a prediction expression that represents a three-dimensional curved plane. Besides, the plane in the modification shown in FIG. 16, that is, the prediction expression, may be provided in a plural number according to the traveling speed, as in the first embodiment.

In step S314, the awake state estimation portion 107 corrects the corrective steering angle calculated in step S307, on the basis of the prediction expression derived in step S313. More concretely, the awake state estimation portion 107 reads the post-coincidence-process traveling speed, the post-coincidence-process corrective steering angle $\theta_S$, the post-coincidence-process absolute steering angle $\theta_Z$, and the post-coincidence-process average steering angular speed $\omega_H$ from the storage portion 108. Then, the awake state estimation portion 107 specifically determines one of the prediction expressions according to the traveling speed, according to the read traveling speed. Then, the awake state estimation portion 107 substitutes the read absolute steering angle $\theta_Z$ and the read average steering angular speed $\omega_H$ in the specifically determined prediction expression, and thereby calculates a predicted corrective steering angle. The awake state estimation portion 107 performs a correction in which the corrective steering angle $\theta_S$ read in step S314 is divided by the calculated predicted corrective steering angle, and stores the post-correction corrective steering angle into the storage portion 108. In expression (2), the corrective steering angle is divided by the predicted corrective steering angle.

Mathematical Expression 2
$X_1$: steering angle [rad]
$X_2$: average steering angular speed [rad/s]
u'($X_1$, $X_2$): corrective steering angle [rad]
f($X_1$, $X_2$): prediction expression $$u'_{new} = \frac{u'(x_1, x_2)}{f(x_1, x_2)} \quad (2)$$

A reason why the awake state estimation portion 107 in accordance with the modification of the first embodiment performs the process of step S314 will be explained. The awake state estimation portion 107 dividing the read corrective steering angle by the calculated predicted corrective steering angle in step S314 means that the corrective steering angle $\theta_S$ of the driver occurring at the time of process of step S307 is divided by the corrective steering angle that serves as a norm thereof during the awake state of the driver. That is, in step S314, the awake state estimation portion 107 calculates a ratio of the corrective steering angle of the driver during the process of step S307 to the corrective steering angle that serves as a norm. Then, in step S315, the awake state estimation portion 107 in accordance with the modification of the first embodiment, similarly to the first embodiment, reads post-correction corrective steering angles during a period of the window length $W_{NE}$ immediately preceding the time of process of step S315, that is, the foregoing ratio, and calculates a moving standard deviation, that is, a dispersion of the ratio.

Then, in step S316, the awake state estimation portion 107 in accordance with the modification of the first embodiment, similarly to the first embodiment, compares the dispersion of the ratios calculated in step S315 with the pre-determined awake state threshold value $SK_{Wake}$, and thereby estimates the awake state. That is, the awake state estimation portion 107 in accordance with the modification of the first embodiment estimates that the driver's awake state is low if the ratio of the corrective steering angle $\theta_S$ of the driver occurring at the time of the estimation process to the corrective steering angle that serves as a norm thereof during the awake state is greater than or equal to a pre-determined threshold value.

What has been described above is a process performed by the awake state estimation portion 107 in accordance with the modification of the first embodiment. Thus, by the process described above as the modification of the first embodiment, the awake state estimation device can sufficiently restrain the influence that travel of the vehicle along a curved path has on the result of estimation of the awake state, as in the awake state estimation device 10 in accordance with the first embodiment.

The first embodiment and the modification of the first embodiment are described above in conjunction with the case where the type of the traveling path on which the vehicle is present is specifically determined and a correction value is calculated through the use of the three-dimensional correction value map shown in FIG. 6, on the basis of the three variables of the absolute steering angle, the average steering angular speed and the traveling speed (the type of traveling location), and the corrective steering angle is corrected by using the correction value, and the degree of the awake state is estimated on the basis of the post-correction corrective steering angle. However, the awake state estimation device 10 does not need to specifically determine the type of traveling path and estimate the degree of the awake state on the basis of the foregoing variables. For example, the awake state estimation device 10 may also estimate the driver's awake state by the method shown in FIG. 9, on the basis of at least one of the foregoing three variables. In this case, it should be apparent that the number of dimensions of the correction value map shown as an example in FIG. 6 is equal to the number of the variables that the awake state estimation device 10 uses in the degree-of-awake-state estimation process. Furthermore, on the basis of at least one of the foregoing three variables and other variables (e.g., the lateral acceleration, the distance relative to the center line drawn on the road, the steering angular acceleration, etc.), the type of the traveling path on which the vehicle is present may be specifically determined and a correction value is calculated by using a correction value map of one or more dimensions (including four or more dimensions), and the corrective steering angle may be corrected by using the correction value.

Besides, in the first embodiment and the modification of the first embodiment, the correction value and the prediction expression are calculated and derived, respectively, by the awake state estimation device 10 during the period during which the driver is awake. However, it is not altogether necessary that the correction values and the prediction expressions be calculated or derived by the awake state estimation device 10. For example, the awake state estimation device 10 may estimate the awake state on the basis of the correction value or the prediction expression stored beforehand in the storage means. The method of pre-storing the correction value or the prediction expression in the storage means may be a method in which correction values or prediction expressions empirically determined are pre-stored in the storage means, a method in which correction values or prediction expressions calculated or derived by using other vehicles, experiment devices, etc. are pre-stored in the storage means, etc. Then, the awake state estimation device 10 may also appropriately update the correction values or the prediction expressions stored in the storage means by the foregoing method of calculating the correction values or the method of deriving the prediction expressions.

According to the invention, the driver's awake state can be estimated. The invention can be utilized, for example, in an awake state estimation device that estimates the awake state of the driver of a mobile unit, such as a vehicle or the like.

What is claimed is:

1. An awake state estimation device that determines whether a driver of a vehicle is awake or asleep based on a steering angle of the vehicle, comprising:
    a traveling information acquisition portion that acquires from the vehicle traveling information that changes according to a type of a traveling path on which the vehicle is moving, the traveling information including an absolute steering angle that is a rotation angle of a steering handle, an average steering angle that is a moving average value of the absolute steering angle, an average steering angular speed that is a differential value of the average steering angle, and a traveling speed of the vehicle;
    a corrective steering angle calculation portion that calculates, as a corrective steering angle, a difference between the absolute steering angle and the average steering angle acquired by the traveling information acquisition portion;
    a storage portion that pre-stores a plurality of correction values for the corrective steering angle in association with respective variables that are the absolute steering angle, the average steering angular speed, and the traveling speed, the storage portion pre-storing the plurality of correction values as a correction value map in which the plurality of correction values and the traveling information are associated with a plurality of ranges set based on magnitudes of the variables and the plurality of ranges correspond to types of traveling paths;
    a correction value setting portion that sets the correction value based on the traveling information acquired by the traveling information acquisition portion, the correction value setting portion selecting from the plurality of ranges a range that contains a value of the traveling information acquired by the traveling information acquisition portion, and setting the correction value that is associated with the range;
    a corrective steering angle correction portion that corrects the corrective steering angle calculated by the corrective steering angle calculation portion, by using the correction value set by the correction value setting portion; and
    an awake state estimation portion that determines whether the driver is awake or asleep based on the corrective steering angle corrected by the corrective steering angle correction portion.

2. The awake state estimation device according to claim 1, wherein the plurality of correction values are each a standard deviation of corrective steering angles occurring when the vehicle is moving on a respective type of traveling path and are pre-calculated separately with respect to each of the types of traveling paths, and the corrective steering angle correction portion performs a standardizing correction in which the corrective steering angle is standardized by dividing the corrective steering angle by the correction value, and the awake state estimation portion determines whether the driver is awake or asleep based on the corrective steering angle and based on a predetermined threshold value corresponding to the respective type of traveling path.

3. The awake state estimation device according to claim 2, wherein the awake state estimation portion stores the corrective steering angles obtained over a pre-determined time period up to a present time point and calculates a standard deviation of all the corrective steering angles occurring during a period of time of a pre-determined first window length ending immediately prior to the present time point which are extracted from a history of the corrective steering angles, and determines that the driver is asleep if the standard deviation value is greater than or equal to the threshold value.

4. The awake state estimation device according to claim 1, wherein the correction value map is three-dimensional, and wherein the plurality of ranges are divided based on predetermined magnitudes of three variables, the three variables including the steering angle, the average steering angular speed and the traveling speed.

5. The awake state estimation device according to claim 1, wherein the corrective steering angle calculation portion stores the steering angles that are acquired by the traveling information acquisition portion during a pre-determined time period up to a present time point, and calculates as the average steering angle an average value of all the steering angles acquired during a period of time of a second window length ending immediately prior to the present time point which are extracted from a history of the steering angles, and the corrective steering angle calculation portion sets the second window length shorter with increase in a range of fluctuation of the steering angles acquired by the traveling information acquisition portion, and sets the second window length longer with decrease in the range of fluctuation of the steering angles.

6. The awake state estimation device according to claim 1, further comprising a driver specific determination portion that determines a specific driver from a plurality of drivers, the storage portion pre-storing a plurality of said correction value maps that each correspond to a respective one of the plurality of drivers, wherein the correction value setting portion sets the selected correction value from the correction value map that corresponds to the specific driver.

7. An awake state estimation method that estimates whether a driver of a vehicle is awake or asleep based on a steering angle of the vehicle, the method comprising:
    acquiring the steering angle of the vehicle;
    acquiring, from the vehicle, traveling information that changes according to a type of a traveling path on which the vehicle is moving, the traveling information including an absolute steering angle that is a rotation angle of a steering handle, an average steering angle that is a moving average value of the absolute steering angle, an average steering angular speed that is a differential value of the average steering angle, and a traveling speed of the vehicle;
    calculating, as a corrective steering angle, a difference between the absolute steering angle and the average steering angle;

pre-storing correction value derivation information for setting a correction value associated with the traveling information, wherein the correction value derivation information includes a plurality of correction values stored in association with respective variables that are the absolute steering angle, the average steering angular speed, and the traveling speed, the plurality of correction values stored as a correction value map in which a plurality of ranges correspond to the traveling information and are divided based on predetermined magnitudes of at least one variable corresponding to the traveling information, wherein the plurality of ranges correspond to a plurality of types of traveling paths along which the vehicle can move;

selecting from the plurality of ranges a range that contains a value of the traveling information;

setting the correction value corresponding to the traveling information based on the traveling information and the correction value that is associated with the corresponding range;

correcting the corrective steering angle by using the correction value; and determining by a processor whether the driver is awake or asleep based on the corrective steering angle corrected.

8. An awake state estimation device that estimates whether a driver of a vehicle is awake or asleep based on a steering angle of the vehicle, the device comprising:

traveling information acquisition means for acquiring, from the vehicle, traveling information that changes according to a type of a traveling path on which the vehicle is moving, the traveling information including an absolute steering angle that is a rotation angle of a steering handle, an average steering angle that is a moving average value of the absolute steering angle, an average steering angular speed that is a differential value of the average steering angle, and a traveling speed of the vehicle;

corrective steering angle calculation means for calculating, as a corrective steering angle, a difference between the absolute steering angle and the average steering angle acquired by the traveling information acquisition means;

storage means for pre-storing a plurality of correction values for the corrective steering angle in association with respective variables that are the absolute steering angle, the average steering angular speed, and the traveling speed, the storage means pre-storing the plurality of correction values as a correction value map in which the plurality of correction values and the traveling information are associated with a plurality of ranges set based on magnitudes of the variables and the plurality of ranges correspond to types of traveling paths;

correction value setting means for setting the correction value based on the traveling information acquired by the traveling information acquisition means, the correction value setting means selecting from the plurality of ranges a range that contains a value of the traveling information acquired by the traveling information acquisition means, and setting the correction value that is associated with the range;

corrective steering angle correction means for correcting the corrective steering angle calculated by the corrective steering angle calculation means, by using the correction value set by the correction value setting means; and awake state estimation means for estimating whether the driver is awake or asleep based on the corrective steering angle corrected by the corrective steering angle correction means.

* * * * *